(12) United States Patent
Zatman et al.

(10) Patent No.: US 8,903,017 B2
(45) Date of Patent: Dec. 2, 2014

(54) ARRAY AMPLITUDE MODULATION SYSTEM AND METHOD

(75) Inventors: Michael Zatman, Silver Spring, MD (US); Trevor Owen, Vienna, VA (US)

(73) Assignee: Foster-Miller, Inc., Waltham, MA (US)

( * ) Notice: Subject to any disclaimer, the term of this patent is extended or adjusted under 35 U.S.C. 154(b) by 316 days.

(21) Appl. No.: 13/385,036

(22) Filed: Jan. 30, 2012

(65) Prior Publication Data

US 2013/0195222 A1    Aug. 1, 2013

(51) Int. Cl.
*H04L 27/04*    (2006.01)
*H03C 5/00*    (2006.01)

(52) U.S. Cl.
USPC ............ 375/300; 375/261; 375/268; 375/298

(58) Field of Classification Search
CPC ........ H04L 27/04; H04L 27/361; H01Q 3/28; H01Q 21/06; H01Q 23/00
USPC ......................... 375/260, 268, 298, 300, 261
See application file for complete search history.

(56) References Cited

U.S. PATENT DOCUMENTS

| | | | |
|---|---|---|---|
| 4,580,111 A * | 4/1986 | Swanson ..................... 332/152 |
| 8,004,368 B2 * | 8/2011 | Presti et al. .................. 332/149 |
| 8,463,324 B1 * | 6/2013 | Kormanyos et al. ........ 455/562.1 |
| 2002/0080066 A1 * | 6/2002 | Dent ............................ 342/373 |
| 2010/0105403 A1 * | 4/2010 | Lennartson et al. .......... 455/450 |
| 2011/0140965 A1 * | 6/2011 | Manasson et al. ............ 342/374 |

* cited by examiner

*Primary Examiner* — David B Lugo
(74) *Attorney, Agent, or Firm* — Iandiorio Teska & Coleman, LLP

(57) ABSTRACT

Array amplitude modulation which includes mapping a data symbol to a phase modulation signal and an amplitude modulation signal for transmission from antenna elements; applying the phase modulation signal to the antenna element amplifiers; and generating a pattern of enabling/disabling the antenna element amplifiers as a function of the amplitude modulation to produce a phase and amplitude modulated transmission from the antenna elements.

22 Claims, 21 Drawing Sheets

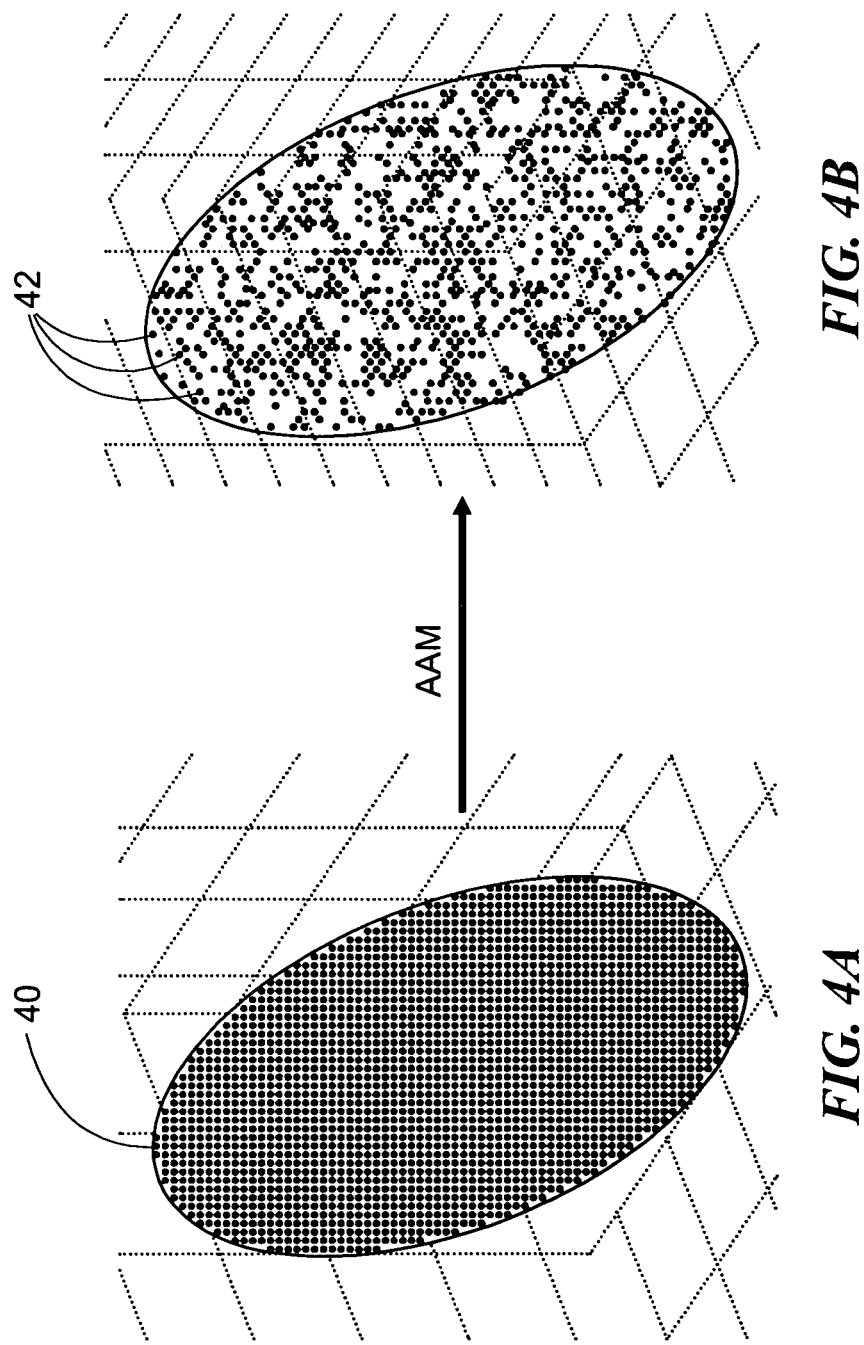

ARRAY AMPLITUDE MODULATION SYSTEM AND METHOD

FIELD OF THE INVENTION

This invention relates to an array amplitude modulation (AAM) system and method and more particularly to such a system and method in which signal amplitude is modulated by enabling/disabling transmit elements in a phased array

BACKGROUND OF THE INVENTION

Modulation is an integral part of digital communication. Communication systems are incorporated in many portable devices which have limited energy and so the pursuit of increasing the energy efficiency of digital modulation is important. In wireless digital communication, modulation is used to transmit digital data by analog means. To do this, digital symbols are embedded into a carrier wave, passed through a medium or channel, and extracted from the carrier on the receiving side. Symbols can be modulated into a carrier wave by changing the amplitude, frequency, and/or phase of the carrier. In modulation, changes to the amplitude, phase or frequency are called Amplitude Shift Keying (ASK), Phase Shift Keying (PSK), and Frequency Shift Keying (FSK) respectively. Combinations of these exist. One combination in particular is Quadrature Amplitude Modulation (QAM) which combines ASK and PSK. Presently these systems are not wholly satisfactory in the area of power and modulation efficiency. Typically in available systems one can choose to have either efficient modulation but not efficient amplification or efficient amplification but not efficient modulation. To explain: PSK, which is not the most efficient type of modulation can use efficient non-linear amplifiers, e.g. class C amplifiers. QAM can provide very efficient modulation but it must use inefficient linear amplifiers, e.g. class A, class AB.

SUMMARY OF THE INVENTION

In accordance with various aspects of the subject invention in at least one embodiment the invention presents an improved modulation approach, array amplitude modulation (AAM) which provides increased power and efficiency and improved resistance to interception while reducing size and weight.

The subject invention results from the realization that, in part, a new array amplitude modulation (AAM) method and system which enables smaller and lighter equipment yet increases power and efficiency and even improves resistance to interception in various aspects can be achieved by mapping a data symbol to a phase modulation signal and an amplitude modulation signal for transmission from antenna elements, applying the phase modulation signal to the antenna element amplifiers, and some of the antenna element amplifiers as a function of the amplitude modulation to produce a phase and amplitude modulated transmission from the antenna elements.

The subject invention, however, in other embodiments, need not achieve all these objectives and the claims hereof should not be limited to structures or methods capable of achieving these objectives.

This invention features an array amplitude modulation system including a mapping circuit for mapping a data symbol to a phase modulation signal and an amplitude modulation signal, a plurality of antenna elements, an amplifier associated with each antenna element, and a control circuit responsive to the amplitude modulation signal to selectively enable/disable the amplifiers to produce a phase and amplitude modulation transmission from the antenna elements.

In preferred embodiments the amplifiers may include non-linear amplifiers. The control circuit may include a pattern generator for identifying the amplifiers to be selectively enabled/disabled. The control circuit may include a switching circuit responsive to the pattern generator circuit for selectively enabling/disabling identified amplifiers. The pattern generator may include a look-up table. The pattern generator may generate a random pattern of amplifier enabling/disabling. The pattern generator may generate a regular pattern of amplifier enabling/disabling. The regular pattern may include an interleaved pattern. The regular pattern may include a peripheral pattern of amplifier enabling/disabling. The peripheral pattern may include an outer diameter pattern. The array amplitude may further include a custom modulator for generating a custom amplitude modulation signal shifted relative to the amplitude modulation signal and a matching custom demodulation scheme for demodulating the custom modulation. The custom modulator and/or demodulator may be responsive to a small array quantizing error input to adjust for small array quantizing error. The custom modulator and/or demodulator may be responsive to a steering error input to adjust for steering error.

This invention also features a method of array amplitude modulation including mapping a data symbol to a phase modulation signal and an amplitude modulation signal for transmission from antenna elements, applying the phase modulation signal to the antenna element amplifiers, and generating a pattern of enabling/disabling the antenna element amplifiers as a function of the amplitude modulation to produce a phase and amplitude modulated transmission from the antenna elements.

In preferred embodiments the amplifiers may be nonlinear amplifiers. The patterns may include random and regular. The regular patterns may include interleaved, peripheral, and outer diameter. The array amplitude modulation may further include generating a custom amplitude modulation signal shifted relative to the amplitude modulation signal. The custom amplitude modulation signal may be generated in response to a small array quantizing error signal. The custom amplitude modulation signal may be generated in response to a steering error signal.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 4A and B illustrate the pattern of switched, enable/disabled amplifiers or antenna elements in accordance with the AAM of one embodiment of this invention;

DETAILED DESCRIPTION OF THE INVENTION

Figure 1A:
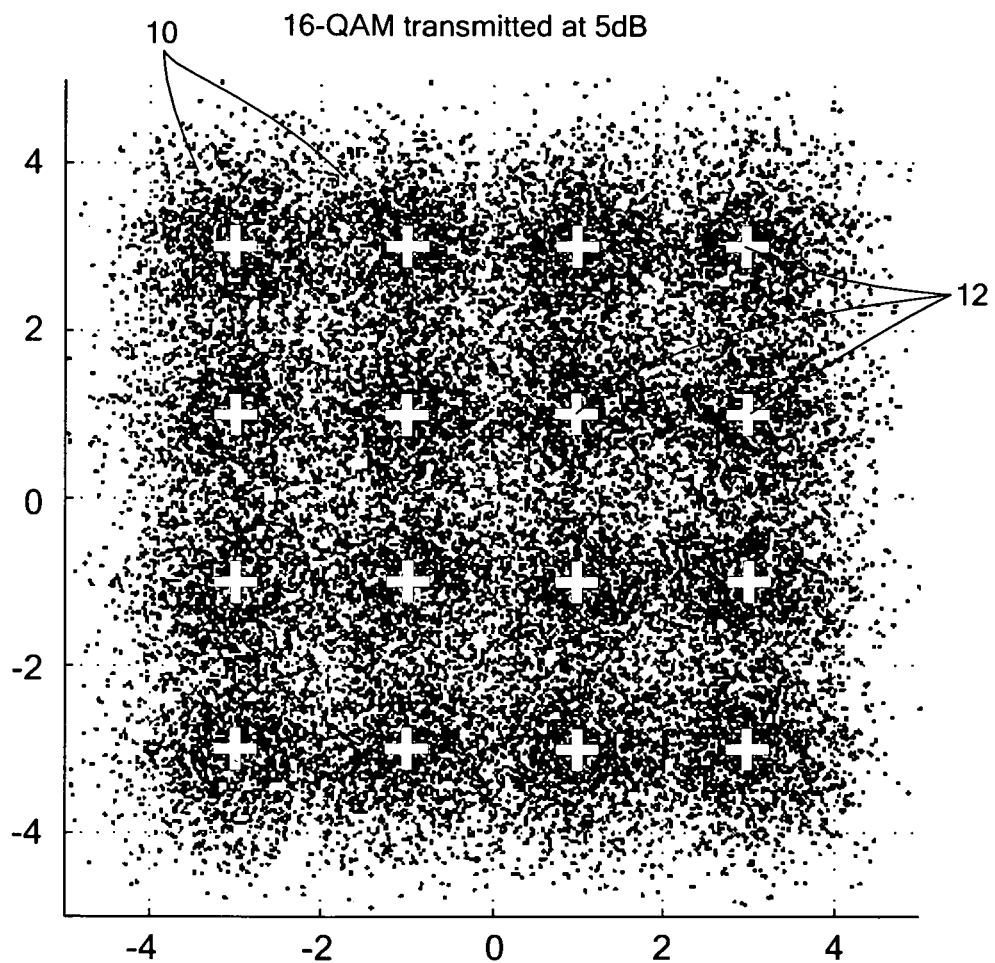
FIGS. 1A-D are scatter plots showing the effect of noise on constellation diagrams of amplitude and phase modulation.
Figure 1B:
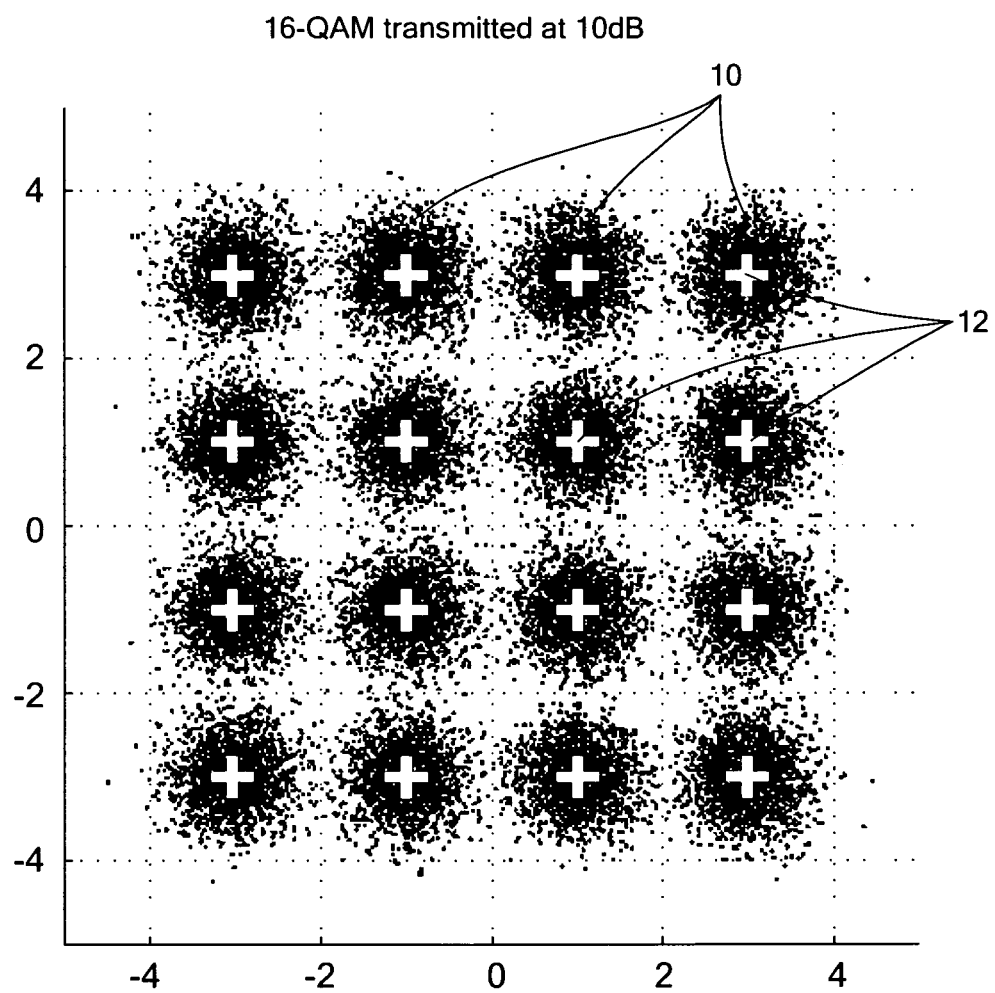

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Array amplitude modulation (AAM) according to this invention uses a phased array to transmit a QAM signal. Each array element in a preferred embodiment uses power-efficient nonlinear amplifiers to transmit the phase portion of the QAM signal. The amplitude portion of the QAM modulation is produced by switching some of the transmit amplifiers on and off. Three patterns for switching the array are disclosed here. Also disclosed are two issues referred to as small array quantization (SAQ) error and steering error along with a custom method for modulation and modulation/demodulation for mitigating the effects of these sources of error.

This invention is applicable to both ASK and QAM. The complexity of QAM is determined by the number of symbols it is able to convey. This is commonly referred to as MQAM, where the first M denotes the number of distinct symbols. For example, 16 QAM can send 16 different symbols corresponding to 4 bits of information and 64 QAM can send 64 symbols corresponding to 6 bits of information.

The amplitude and phase modulation can be represented in a constellation diagram. A constellation diagram is a complex-plane representation of the signal with the real axis (x) representing the in-phase component and the imaginary axis (y) representing the out-of-phase or quadrature component. On the constellation, the distance from the origin represents the amplitude of the signal and the positive angle from the positive real axis represents the phase of the signal. In digital modulation, the constellation includes a number of positions that correspond to the number of possible symbols to send. The position of each symbol is relative to each other and the origin. The constellation is used in the transmitting system to properly modify the carrier for a specific symbol and also in the receiving system to determine what symbol was received.

When demodulating data, it is important to realize the effect of noise on the system. In most channels, the noise is modeled as additive white Gaussian noise (AWGN) which has a constant spectral density and a Gaussian distribution of amplitude given by $$\frac{1}{\sqrt{2\pi\sigma^2}} e^{-\frac{(x-\mu)^2}{2\sigma^2}}, \quad (1)$$

where $\mu$ is the mean or peak location and $\sigma^2$ is the variance of the noise. Noise is important but only as compared to the power of the signal. $E_b/N_o$ refers to the ratio of the energy of each bit to the noise level, given by:

$$\frac{E_b}{N_o} = \frac{1}{b}\left(\frac{V_C}{V_N}\right)^2 \left(\frac{B}{S_r}\right), \quad (2)$$

where $S_r$ is the symbol rate, b is the number of bits per symbol, B is the channel bandwidth, and $V_c$ and $V_N$ are the RMS voltage of the carrier and noise, respectively. $E_s/N_o$, or symbol energy-to-noise or symbol energy-to-noise ratio, is given by:

$$\frac{E_s}{N_o} = b\frac{E_s}{N_o}. \quad (3)$$

$E_b/N_o$ and $E_s/N_o$ are usually measured in decibels.

Figure 1C:
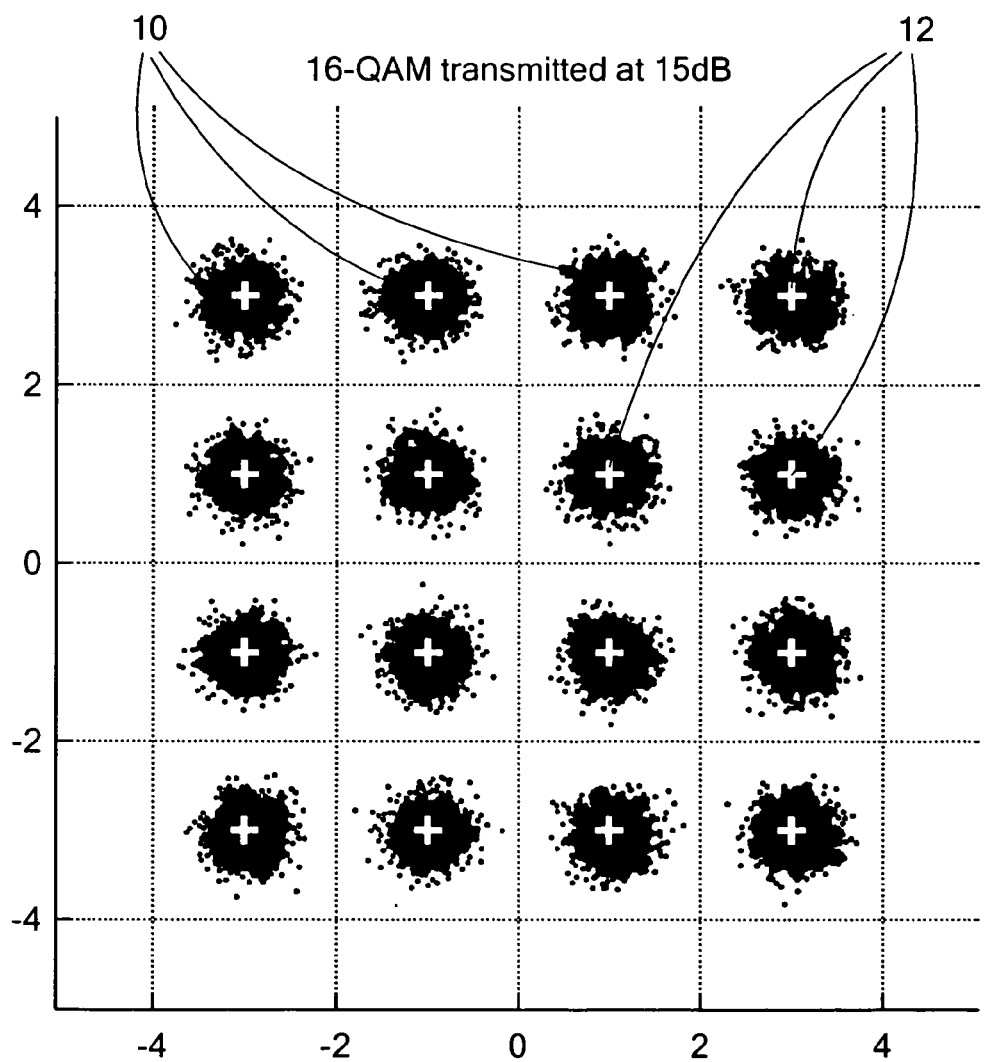
Figure 1D:
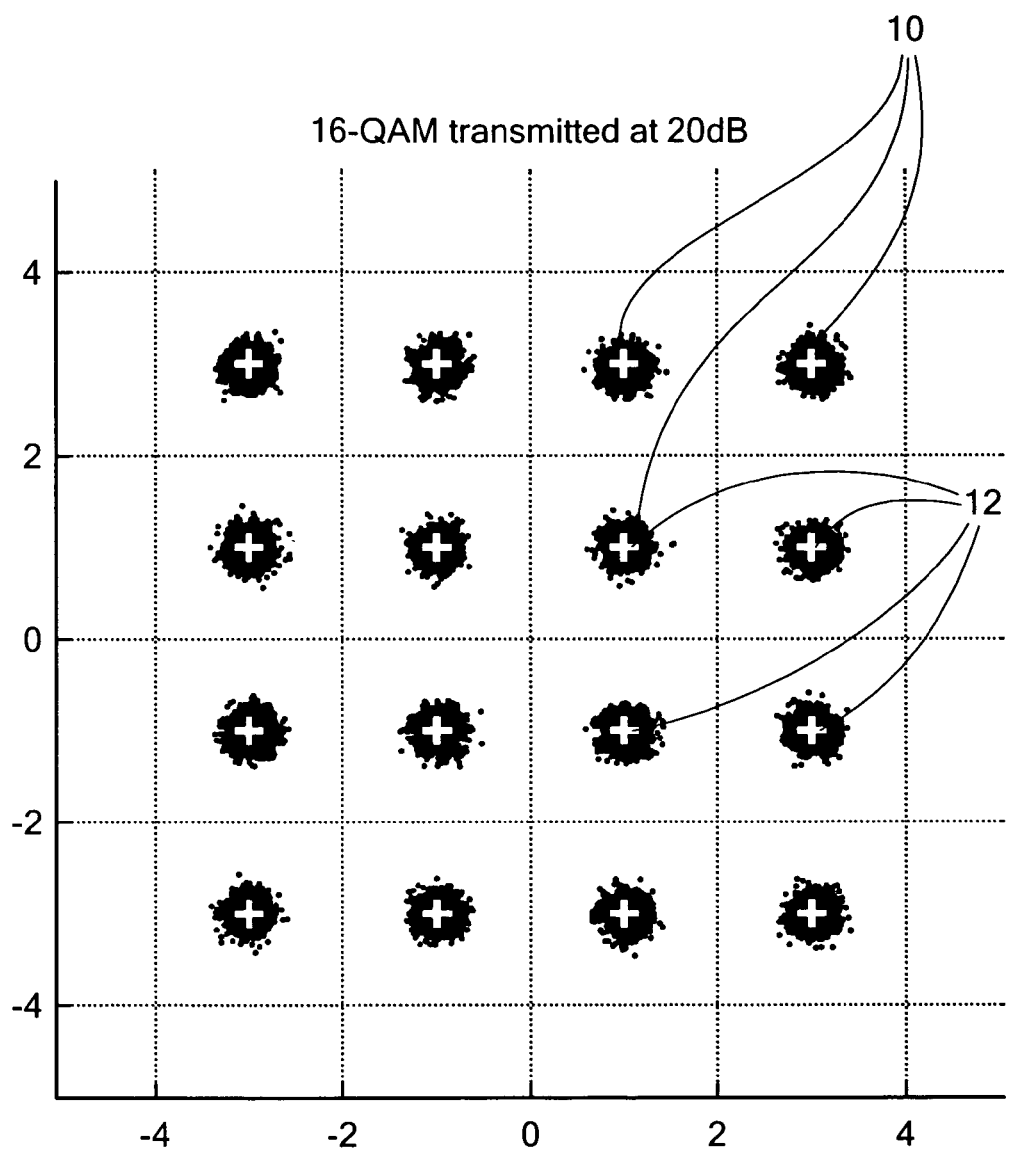

There is shown in FIGS. 1A-D examples of the effect of noise on the constellation. These scatter plots are used to show the clusters of simulated data, dots 10, around their respective targets, shown by crosses 12. FIG. 1A shows a 16 QAM modulation at 5 dB $E_b/N_0$, FIG. 1B a 16 QAM modulation transmitted at 10 dB $E_b/N_0$. FIG. 1C at 15 dB $E_b/N_0$ and FIG. 1D at 20 dB $E_b/N_0$. As the transmission power increases the separation between symbols becomes better and the bit-error-rate (BER) (described later) improves. Without noise there would be an infinite $E_b/N_0$ and no errors in signal transmission. However, noise is always present and can cause symbols to be demodulated incorrectly. When comparing the received symbols to the original transmitted symbols, two metrics can be used to characterize the quality or expected error. The first is the symbol error rate (SER) which corresponds to the ratio of the number of erroneous symbols to the overall transmission. The second is the bit error rate (BER) which is found by comparing individual bits and finding the error ratio. While an entire symbol may be demodulated incorrectly, it is possible for a majority of the bits comprising that symbol to be correct. Herein, Gray mapping is used which alternates the symbol mapping on the constellation so that no two adjacent symbols have more than one different bit.

Gray mapping maximizes the number of correct bits in the event of an adjacent symbol error. There are also techniques which utilize adaptive QAM to lower the error rates of the system by adjusting the modulation complexity. This new array amplitude modulation (AAM) taught by this invention is applicable to all forms of amplitude and QAM modulation.

The expected BER and SER are values that can be estimated based on the known noise level of the system. When determining the theoretical number of symbol errors, an assumption is made that symbol errors only occur in adjacent symbols. This can be visualized as the overlapping of symbol distributions on the constellation scatter plot. This assumption is made because symbol errors other than adjacent errors indicate a level of noise which is too high for accurate transmission. The symbol error rate for QAM can be approximated by:

$$SER_{MQAM} \approx 4\left(1 - \frac{1}{\sqrt{M}}\right) \text{erfc}\left(\sqrt{\frac{3b\frac{E_b}{N_o}}{M-1}}\right), \quad (4)$$

where b is the number of bits per symbol, and M is the constellation size and "erfc" is the complementary error function as defined by:

$$\text{erfc}(x) = \frac{1}{\sqrt{2\pi}} \int_x^{-\infty} e^{\frac{-y^2}{2}} dy. \quad (5)$$

For Gray constellations BER can be approximated by:

$$BER_{MQAM} \approx \frac{SER_{MQAM}}{b} \quad (6)$$

due to the nature of Gray mapping. Gray mapping assumes that only adjacent symbol errors will occur which will result in only one bit error. Expression (4) is used here to track the measured error against the theoretical. Herein, the measured error is calculated by a Monte Carlo simulation of the transmission of thousands of data points. After transmission, the measured error rates are calculated as a ratio of incorrect data over the total amount of data sent.

Figure 2:
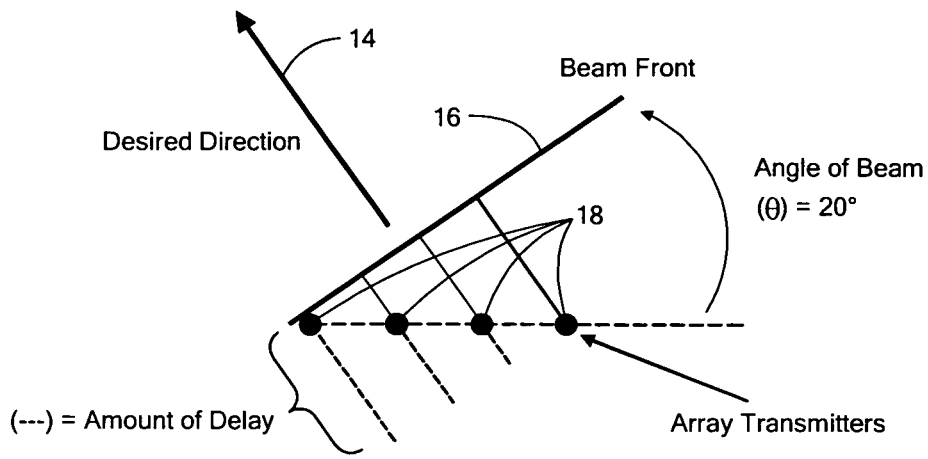
FIG. 2 is a schematic diagram showing beam front forming at angle θ.

This invention involves phased array transmit antennas, so it is important to understand phased arrays. When more than one transmitter is used the transmissions can constructively or destructively interfere with each other, so it is important to time/phase the transmissions appropriately. This is done by delaying certain transmitters more than others so that their combined transmission constructively interfere in the desired direction to form a coherent beam front, as shown in FIG. 2, where the desired direction 14 of beam front 16 at angle θ (which may for example be 20°) is achieved using an array of transmitters 18. Each transmitter 18 is provided with a different amount of delay to produce beam front 16 at the angle θ in a desired direction 14. Here increasing amounts of delay are added moving from right to left across the array transmitters 18. By applying an appropriate delay for each transmitter, the resulting beam front can be "steered" in a desired direction. The desired direction is called the steering angle or pointing vector, and is represented by k. For any array defined in three dimensional space, k is defined as $$k = \begin{bmatrix} \cos\phi\cos\theta \\ \cos\phi\sin\theta \\ \sin\phi \end{bmatrix} \quad (7)$$

where θ is the horizon or azimuth angle from the positive x axis and φ is the elevation angle from the xy plane.

By timing the transmissions correctly, the signal will be amplified in the desired direction and cancelled in others. It is important to note that the steering angle is only unique in a three dimensional configuration of transmitters. In a linear array, the signal can only be delayed along the axis of the array. This means that the steering angle would be symmetric about the linear axis of rotation, creating a beam front in a cone shape around the linear array. In a two dimensional array, the signal can only be delayed along the plane, but cannot be delayed out of the plane. This means the beam pattern would be symmetric about the array plane and would send the beam front in front of and behind the array.

To better analyze the output of an array, a radiation pattern or beampattern is produced. A beampattern is an expression of the signal strength from the array as a function of angle. The radiation pattern of an arbitrarily spaced three dimensional array of N elements is expressed as $$E(\theta, \varphi) = \sum_{n=1}^{N} f_n(\theta_{st}, \phi_{st}) e^{jk*r_n}, \quad (8)$$

where $$k*r_n = \frac{2\pi}{\lambda}(x_n\cos\phi\cos\theta + y_n\cos\phi\sin\theta + z_n\sin\phi) \quad (9)$$

and $$f_n(\theta_{st}, \phi_{st}) = e^{j(k(\theta_{sc},\phi_{st})*r_n)}, \quad (10)$$

where $(x_n, y_n, z_n)$ is the location of the element n, λ is the wavelength at the carrier frequency, $\theta_{st}$ is the horizon or azimuth steering angle and $\phi_{st}$ is the elevation steering angle. Dividing by λ allows the array coordinates to be in wavelengths. Plotting equation (8) results in a beampattern.

Figure 3:
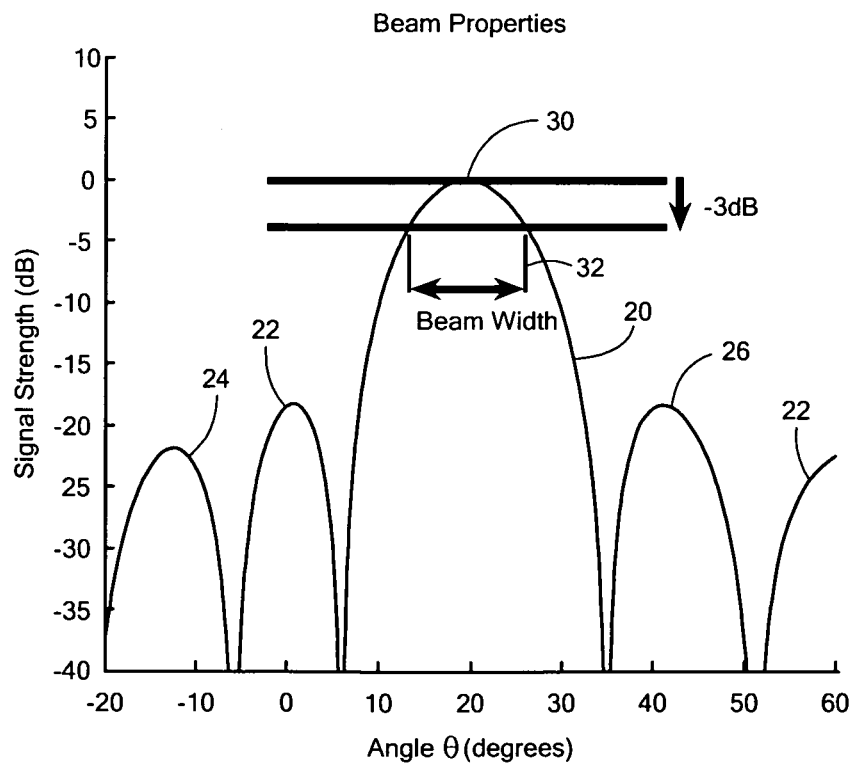
FIG. 3 is an example of a beam pattern generated according to FIG. 2.

A typical beampattern consists of a main beam 20, FIG. 3, in the desired direction with several smaller lobes on the sides 22, 24, 26, 28 for example. A planar array, which is steered by adjusting the delay of individual transmitters, projects a mirror image beampattern from each face of the array. Beampatterns generally discard redundant information that would result from symmetry. (For example, only plotting the forward facing 180 degrees of a planar array). The main beam represents the signal in the direction of the steering angle and the side lobes are a product of mixed cancellation in other directions. The two main components of a beampattern are the beam power and the beam width. The typical beampattern shown in FIG. 3 is produced using equation (8) with a $\theta_{st}$ of 20 degrees and φ held constant at zero. The main beam occurs at 20 degrees and has a relative peak beam power of 0 dB. The beam power is the max power of the main beam 30 and the beam width 32 is the width of the main beam at about −3.0 decibels from peak or half power.

The array amplitude modulation (AAM) of this invention is a method and system for amplitude modulation (AM) and quadrature amplitude modulation (QAM) transmission system that turns on or off amplifiers to affect the amplitude modulation while increasing efficiency. In preferred embodiment the amplifiers may be power-efficient non-linear amplifiers. The AAM system and method uses multiple active transmitters with linear or nonlinear transmit amplifiers at a fixed amplification. Using amplifiers at fixed amplification means they will either be on or off. By operating them in this way, the system does not need a model for the nonlinear region. In this approach, instead of using the amplifier to linearly amplify an amplitude modulated signal, individual transmitters are switched on or off to decrease/increase the signal's amplitude as shown in FIGS. 4A and B. To do this, the QAM signal is split into a normalized Phase Shift Keyed (PSK) signal and a corresponding amplitude signal. The normalized PSK signal is sent to all transmitters while the amplitude signal is used to turn transmitters on or off. By only sending the PSK signal to each transmitter, each transmitter is able to operate efficiently at a constant gain and in a preferred embodiment even more efficiently they may be implemented using nonlinear amplifiers, e.g. class C amplifiers. The resulting beamformed signal from the phased array is theoretically identical QAM (or ASK in the absence of phase modulation) in the steered direction except for the small array quantization (SAQ) and steering error effects described, infra. This approach is referred to as array amplitude modulation (AAM). It is depicted in FIGS. 4A and 4B where FIG. 4A shows the array of all antenna amplifier elements 40 while FIG. 4B shows only those antenna amplifier elements 42 which are on, enabled, (or off disabled). Since turning off an antenna element reduces both the transmitted power and the transmit antenna gain, the radiated signal power in the direction of the antenna's main beam varies with the square of the number of transmitting antenna elements i.e.

$$P_R = E_R N_E^2$$

where $P_R$ is the total radiated power in the direction of the main beam, $E_R$ is the radiated power from a single antenna element and $N_E$ is the number of transmitting antenna elements. This square relationship means that to reduce the power at the receiver by 25% (e.g., from the 100% to 75%) 13.4% of the elements are switched off.

By way of further explanation consider AAM in the context of the constellation diagram. It is important to note that the distortion effect of using even nonlinear amplifiers has no effect on the AAM system. Each position on the constellation diagram is normalized to the farthest point from the origin. In the case of QAM this is coincident with the four outer corners of the original QAM constellation. This corresponds to having all of the transmitters turned on. To modulate the signal's amplitude, a fraction of the amplifiers are turned off. Using the beamforming technique, this fractional transmission effectively moves the points from the edge of the constellation diagram towards the center. There are many different patterns in which the antenna transmitter amplifiers may be turned on and off to modulate the amplitude. They may be any number of random patterns and regular patterns. The regular patterns may be interleaved, peripheral and if peripheral they could be outer diameter types. Three are shown. The first is regular/peripheral/outer diameter modulation FIG. 5A. When the desired power level is decreased, the transmitters will turn off in concentric rings, starting with the outer ring and moving inward. In FIG. 5B random modulation is shown. To decrease the signal power, random transmitters (randomly chosen using a uniform probability distribution, though other distributions may be used) throughout the array are shut off. Note that while in the specific embodiment disclosed here the transmitters are on and are turned off to achieve a selected pattern. The invention is not so limited. The opposite is operable too. The choice of enabling or disabling is not a limitation of the invention.

Figure 5C:
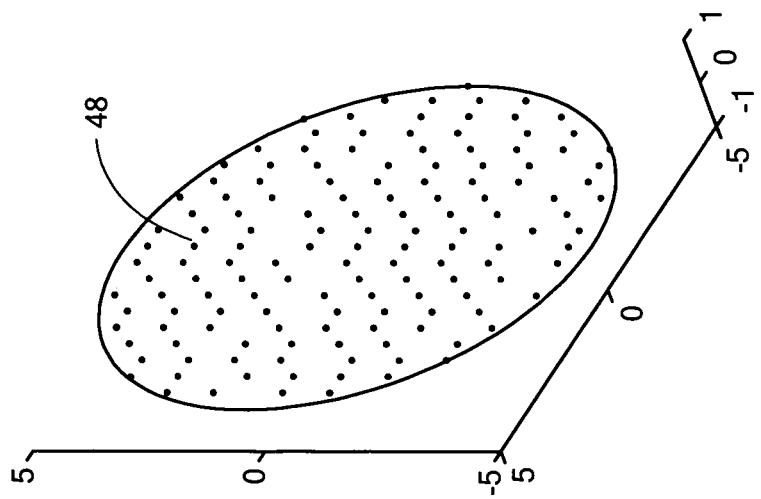
FIGS. 5A-C illustrate the pattern of switched, enable/disabled amplifiers or antenna elements in accordance with three different switching patterns: regular (peripheral-outer diameter); random; and regular (interleaved), respectively.
Figure 5B:
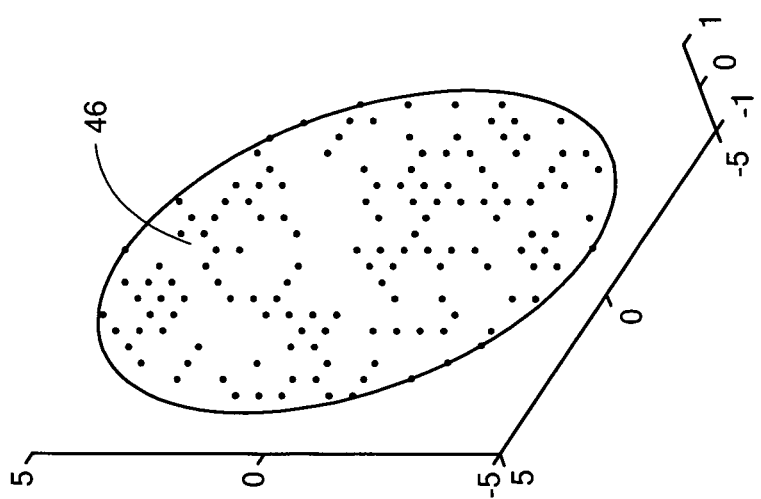
Figure 5A:
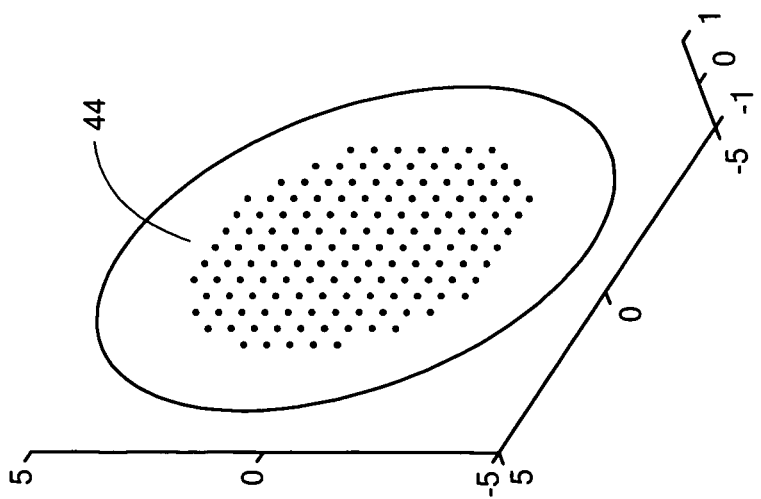

The final pattern is a regular/interleaved modulation pattern shown in FIG. 5C. This mode is similar to random modulation, except the selection of transmitters is evenly distributed or interleaved throughout the array to keep a constant density of operating transmitters.

The QAM signal is created by sending the PSK signal through the transmitters and modulating the amplitude by switching on and off individual transmitters. The on/off vector has a binary value for each transmitter in the array. The technique varies by modulation type and the array's outer dimension D (diameter for a circle, side length for a square). If the outer dimension AAM technique is used, a new diameter variable $D_{mod}$ is defined as:

$$D_{mod} = D\sqrt{mod}, \quad (11)$$

where "mod" is the desired fraction of transmitters to leave on. Each transmitter element's position is compared to this new diameter. If the element is outside the new circle, it is shut off. Each position in the new on/off vector corresponds to an element. The decision inequality for the on/off vector is defined by:

$$((x_n)^2 + (y_n)^2 + (z_n)^2) < \left(\frac{D_{mod}}{2}\right)^2, \quad (12)$$

where the $x_n$, $y_n$, and $z_n$ are the position of the nth element. If expression 12 is true, then onoff$_n$ is set to 1. If expression 12 is false, then onoff$_n$ is set to 0. The variable onoff$_n$ is the nth value of the on/off vector corresponding to the nth transmitter element. If the number of remaining elements (left on) does not match the desired mod value, it means that a fraction of a ring must be switched on or off. If this is the case, $D_{mod}$ is shifted slightly inward or outward and the process is repeated. This time, once the desired number of transmitters is met, the process is stopped. If interleaved modulation is chosen, a different approach is taken. An interval is defined using $$mod_{interval} = \frac{1}{1 - mod}, \quad (13)$$

which gives the number of transmitters to leave on for every one that is turned off. This interval is used to turn off every transmitter after the interval (by sequentially going through the elements). If elements are selected to be turned off, the corresponding onoff value is set to zero. Otherwise, it is left at 1. If the interval is not an integer number of transmitters, the remainder is added to the next interval. For example, if mod=0.6, which corresponds to 60% of transmitters left on, the interval would be every 2.5 transmitters. When counting through the elements, the second transmitter would be turned off, then the third, then the second, then the third, etc. This would average to 60% of transmitters left on. Finally, if random modulation is selected, a random on/off vector is created with decimal values from zero to one. The values are selected using a uniform probability distribution. The decimal on/off vector is then converted to a binary decision on/off vector by comparing each value to the mod value. If an on/off value is greater than the mod value, that on/off position is set to zero. If it is less than the mod value, the on/off position is set to 1. After the onoff vector is converted, a check is done to make sure the correct number of elements was switched off according to the mod level. If not, the process is repeated. Note that for the interleaved and random modulation the way the antenna elements are assigned in the onoff vector can change with time. For example, different realizations of the random distribution may be loaded into the onoff vector at different time intervals. This would ensure that on average all elements in the array are used an equal amount of the time.

Beamforming is a function of array dimensions and spacing. As a result, each AAM approach produces a different beampattern. While each beampattern is unique to a specific array, each AAM approach has predictable patterns that affect modulation/demodulation. Even though all approaches produce identical amplitude levels in the direction of the main beam, the side lobes are different.

Figure 6A:
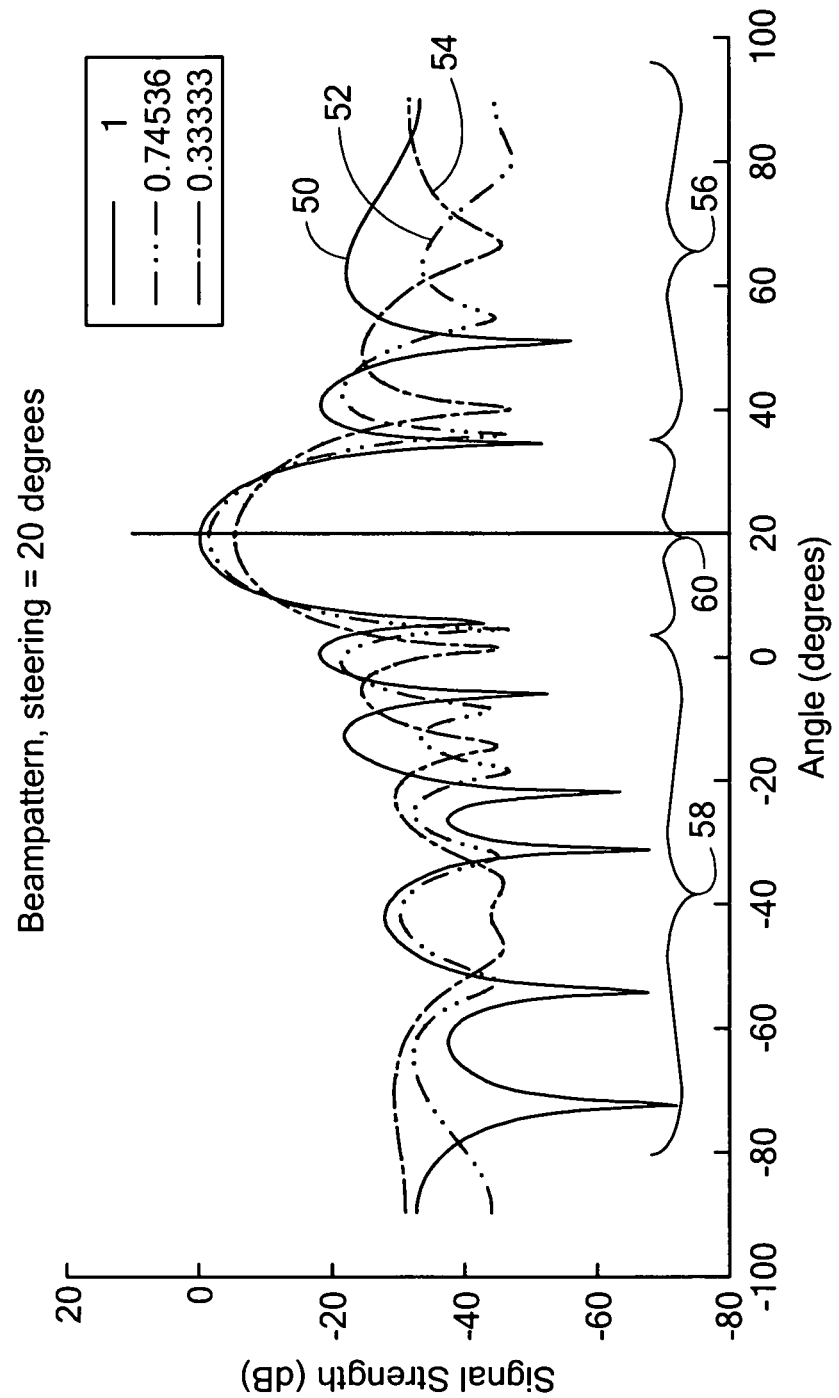
FIGS. 6A-C illustrate the beam formations for outer diameter, interleaved and random switching patterns of FIGS. 5A-C, respectively.

For example in the regular/peripheral/outer diameter modulation there is increased beamwidth at lower power levels. As a lower power level is required, the outer transmitters are turned off. This affects the beamwidth as it is a function of array outer diameter. As a result, it can be seen from FIG. 6A that the beam width widens with decreasing power level. Three different outer diameter characteristics are shown for the different power levels. Power level 1.0, 50, power level 0.74536, 52, and power level 0.3333, 54. In addition the side lobes 56 and 58 can be seen to drift away from the main lobe 60 as the entire beam pattern seems to stretch away from the main beam.

Figure 6B:
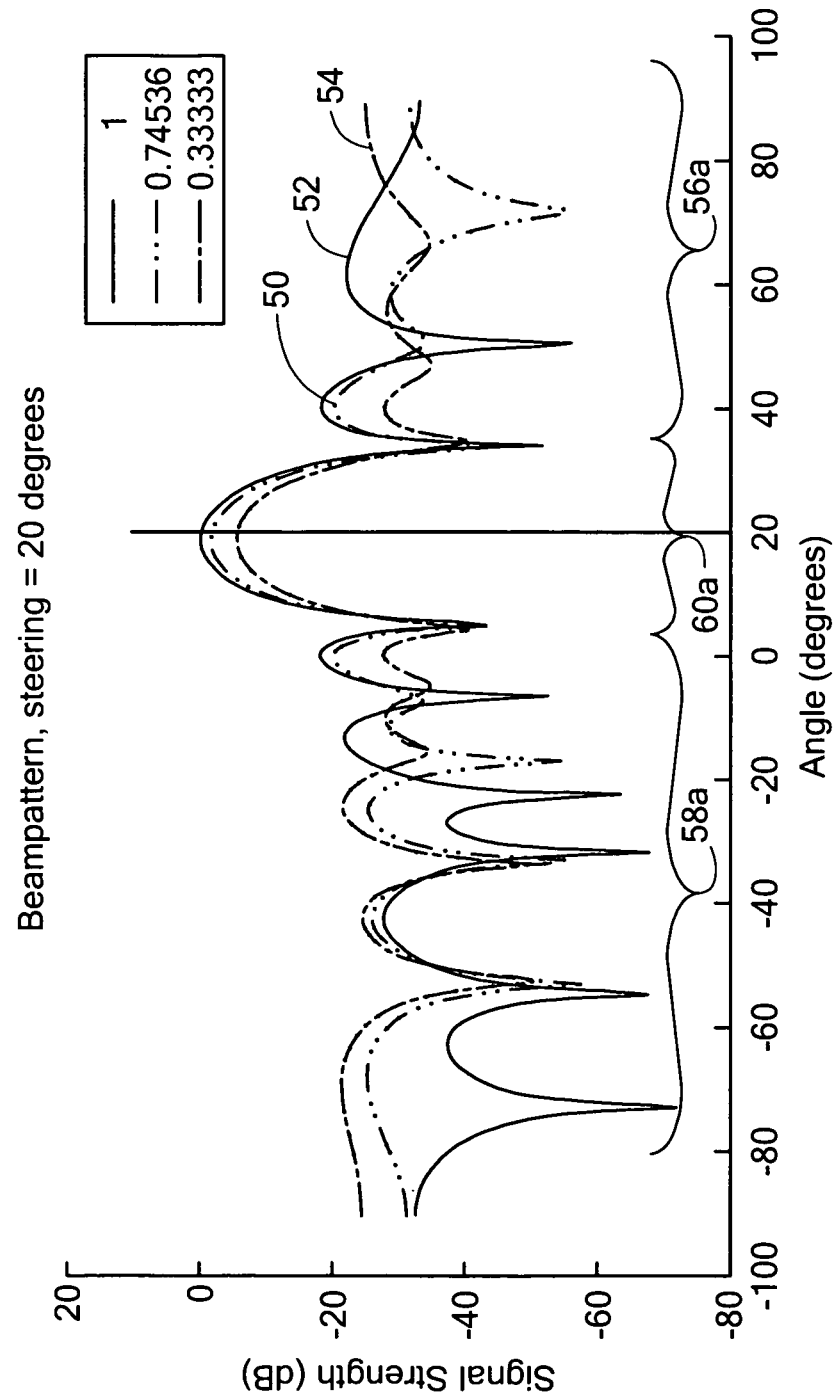

Random modulation keeps a constant outer diameter when modulating lower power levels and instead turns off random elements throughout the array. This produces an inconsistent density of transmitters. As can be seen from FIG. 6B, the main beam 60a has a roughly constant beam width with each power level. However, the power levels of the side lobes 56a and 58a become random away from the main beam 60a. Relative to each other, they do not have the same ratio of power levels. This effect is caused by the inconsistent density of the operating transmitters. This sidelobe property provides an added low probability of intercept/detection to the transmissions, since the resulting random modulation of the sidelobe region makes the signal harder to detect and intercept, an excellent benefit.

Figure 6C:
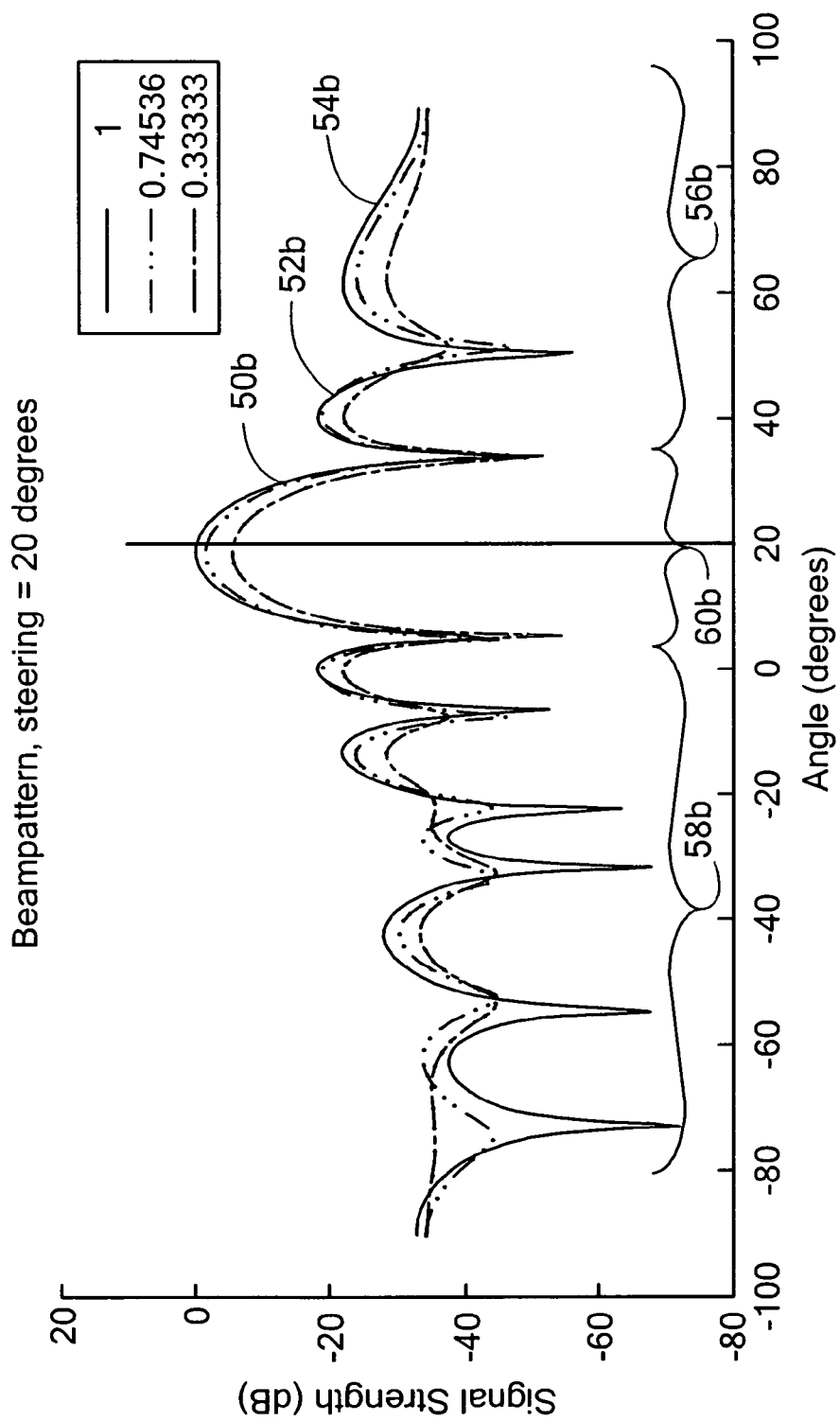

Interleaved modulation turns off interior elements in an even fashion, conserving the density of transmitters in the array. As a result, the beam width is conserved and the side lobes keep their shape with lower power levels as can be seen from FIG. 6C where the ratio of power levels is conserved away from the main beam.

Figure 7B:
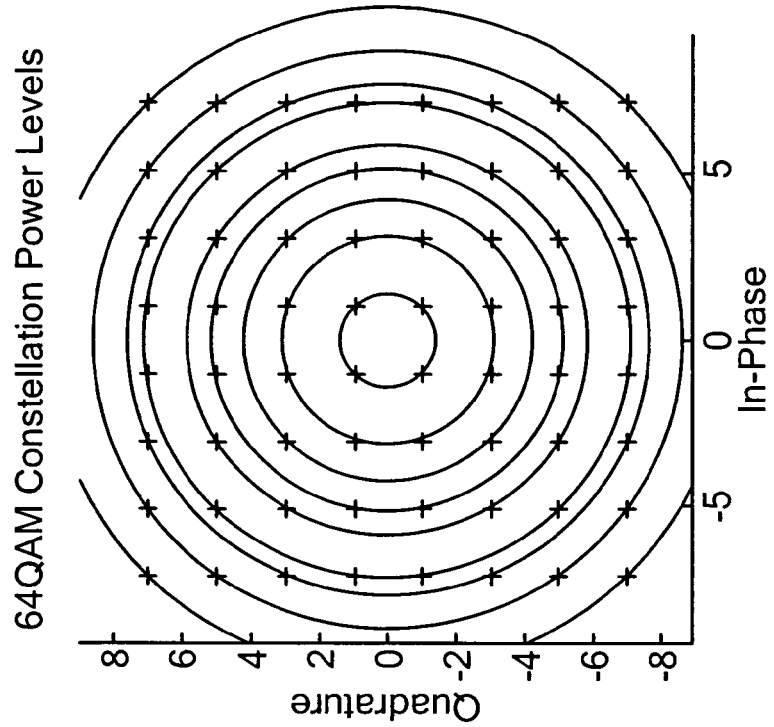
FIGS. 7A and B illustrate required power levels for 16 QAM and 64 QAM modulation, respectively.
Figure 7A:
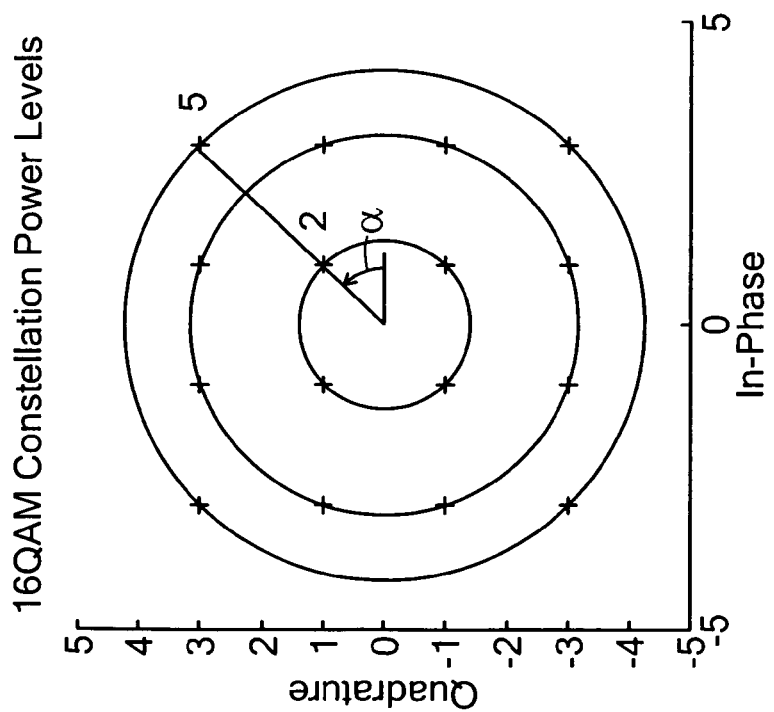

Depending upon the type of modulation, there will be a required number of power levels to emulate. The required power levels for 16 QAM and 64 QAM are shown in FIGS. 7A and 7B, respectively. The required power levels are found by finding the ratio of the radius of each circle, $R_i$, to the radius of the outer circle, $R_{max}$, using $$P_{level} = \frac{R_i}{R_{max}} = \sqrt[2]{I_i^2 + Q_{max}^2} \quad (14)$$

where $I_i$ and $Q_i$ are the coordinates of the ith symbol and $I_{max}$ and $Q_{max}$ are the coordinates of the furthest symbol from the origin. This gives each power level as a fraction of full power. 16 QAM uses three power levels of 1, 0.745, and 0.333 while 64 QAM uses nine levels of 1.000, 0.869, 0.769, 0.714, 0.589, 0.515, 0.429, 0.319, and 0.143. In addition, the desired power level corresponds to the square root of the fraction of transmitters to leave on. As a result, if it was desired to achieve 25% power with an array of 100 transmitters 50 transmitters would be turned off (25% power corresponds to 50% operating transmitters). What this means for AAM is that there must be enough transmitters to accurately emulate all required power levels. However, as the number of available transmitters may be a limiting factor, a range of array sizes is considered to determine the number of transmitters that produces an acceptable error rate. The error associated with this phenomenon is referred to as small array quantization (SAQ) error. To see the effects of SAQ, the new power levels must be found. First, an array is analyzed to find the number of transmitters to leave on for each power level using $$N_{PL} = N_{trans}\sqrt{P_{level}}, \quad (15)$$

where $N_{trans}$ is the number of transmitters in the array and $N_{PL}$ is the number required for the given power level. Since each transmitter can only be on or off, this number needs to be rounded and then converted back to find the real power level using $$P_{newlevel} = \frac{\text{round}(N_{PL})}{N_{trans}}. \quad (16)$$

To illustrate this point, consider a five element transmitter using 16 QAM as an example. 16 QAM has three power levels of 1, 0.745, and ⅓. The calculated number of transmitters to turn off for each power level is 5, 4.317, and 2.887 transmitters. Because each transmitter is either on or off, the numbers are rounded to 5, 4, and 3 transmitters. Reversing the process, this corresponds to 100%, 80%, and 60% of transmitters which corresponds to power levels of 1, 0.64, and 0.36. These new power levels are what the array is capable of producing. Although these are different from the desired power levels, there are still 3 distinct levels. If 64 QAM is considered, which needs 9 power levels, this is not the case. Following the same procedure for 16 QAM, the desired power levels of 64 QAM (1.000, 0.869, 0.769, 0.714, 0.589, 0.515, 0.429, 0.319, and 0.143) become 1.000, 1.000, 0.640, 0.640, 0.640, 0.640, 0.360, 0.360, and 0.160, respectively. It is evident that only 4 different power levels remain, due to the small amount of transmitters in the array.

When a phased array is implemented, an additional variable called the pointing vector is introduced. This pointing vector corresponds to the desired direction of the beamformed signal front. When the pointing vector is accurately steering the array towards a receiving array, the signal phase of each transmitter will line up perfectly and no steering errors will be seen. However, the pointing vector is not always accurate due to a variety of possible errors or the presence of multiple receivers aligned in different directions from the transmitter. For a normal phased array, a single beampattern would be calculated to determine fluctuations in power level due to steering error. In the case of AAM, the beampattern may change as a function of power level; this is especially true for the outer-diameter modulation previously explained with reference to FIG. 6A. Therefore, it is important to simulate the beampattern of each power level to determine the steering error effect on the overall transmitted signal. After the entire beampattern is created, the actual power levels used to send the signal can be found using the angle of steering error. If the ratio of these new power levels is different than the original levels, it will be a source of error. The type of AAM modulation used has a large effect on the steering error and so each case will be unique.

SAQ and steering error can be minimized using a custom form of modulation/demodulation. Ordinary QAM modulation/demodulation compares the received data to the expected ideal constellation which the transmitting system should have emulated. In AAM, this is not always the case. SAQ error and steering error change the transmitted constellation, depending on the mode of AAM used. SAQ error and steering error both create a new set of power levels which are actually used in the transmission of the signal. By analyzing the beampatterns of the modes and errors as well as the dimensions of the array, the corresponding transmitted constellation can be predicted and utilized by the receiving system. This new constellation is calculated by applying the set of power levels to the constellation points. Basically, the power level of each point is adjusted by the ratio of the new power level over the old one. The receiving system can use the new constellation using either of two methods: the calculated new constellation can be preprogrammed into the receiving system or can be transmitted as a prefix to the signal using a simplified transmission technique.

Figure 8A:
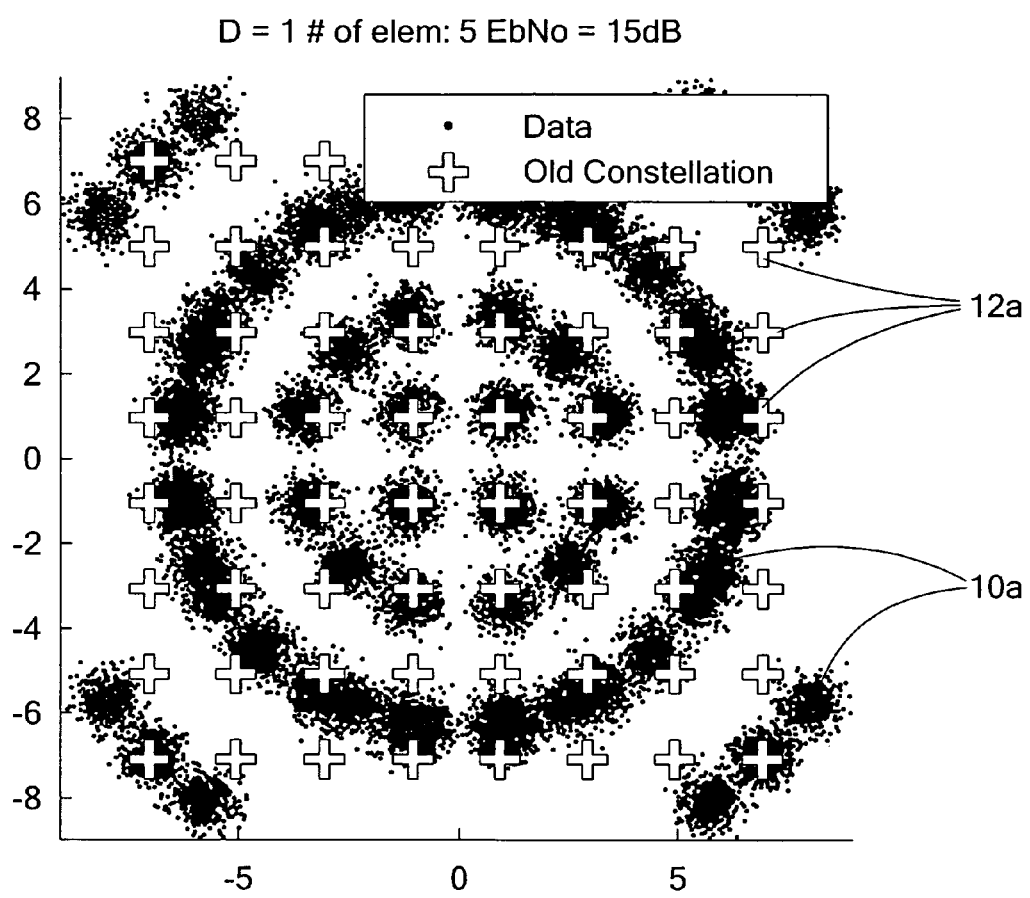
FIG. 8A shows the distortion of the constellation due to small array quantization error and 8B illustrates the improved matching of the data by use of custom modulation/demodulation.
Figure 8B:
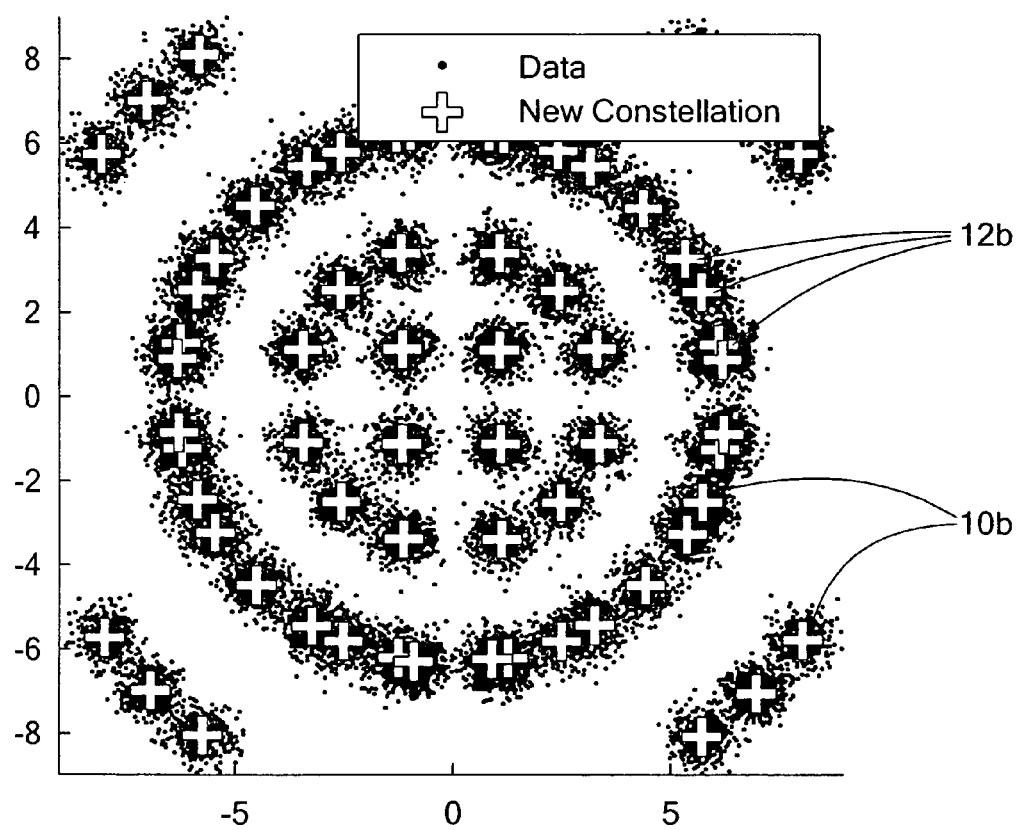

Using this custom modulation/demodulation technique, the BER and SER are improved dramatically. In FIG. 8A, the crosses 12a representing the old constellation in many cases are not properly matched with the data indicated by clusters of dots 10A but with the custom modulation/demodulation shown in FIG. 8B the new constellation indicated by the crosses 12b more nearly match the data 10b.

Figure 9:
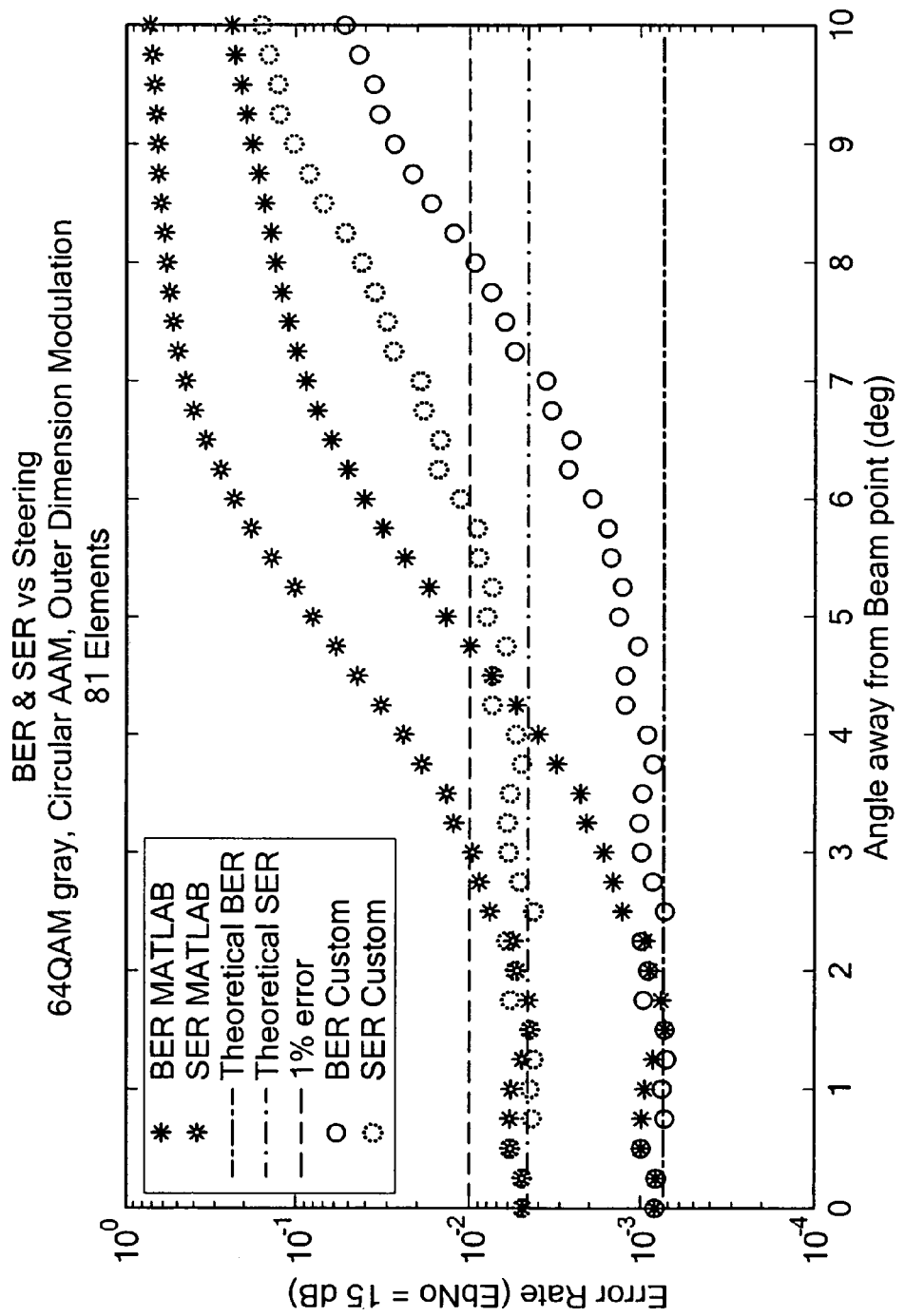
FIG. 9 illustrates the improvement in performance resulting from AAM custom modulation/demodulation in the presence of steering error.
Figure 10:
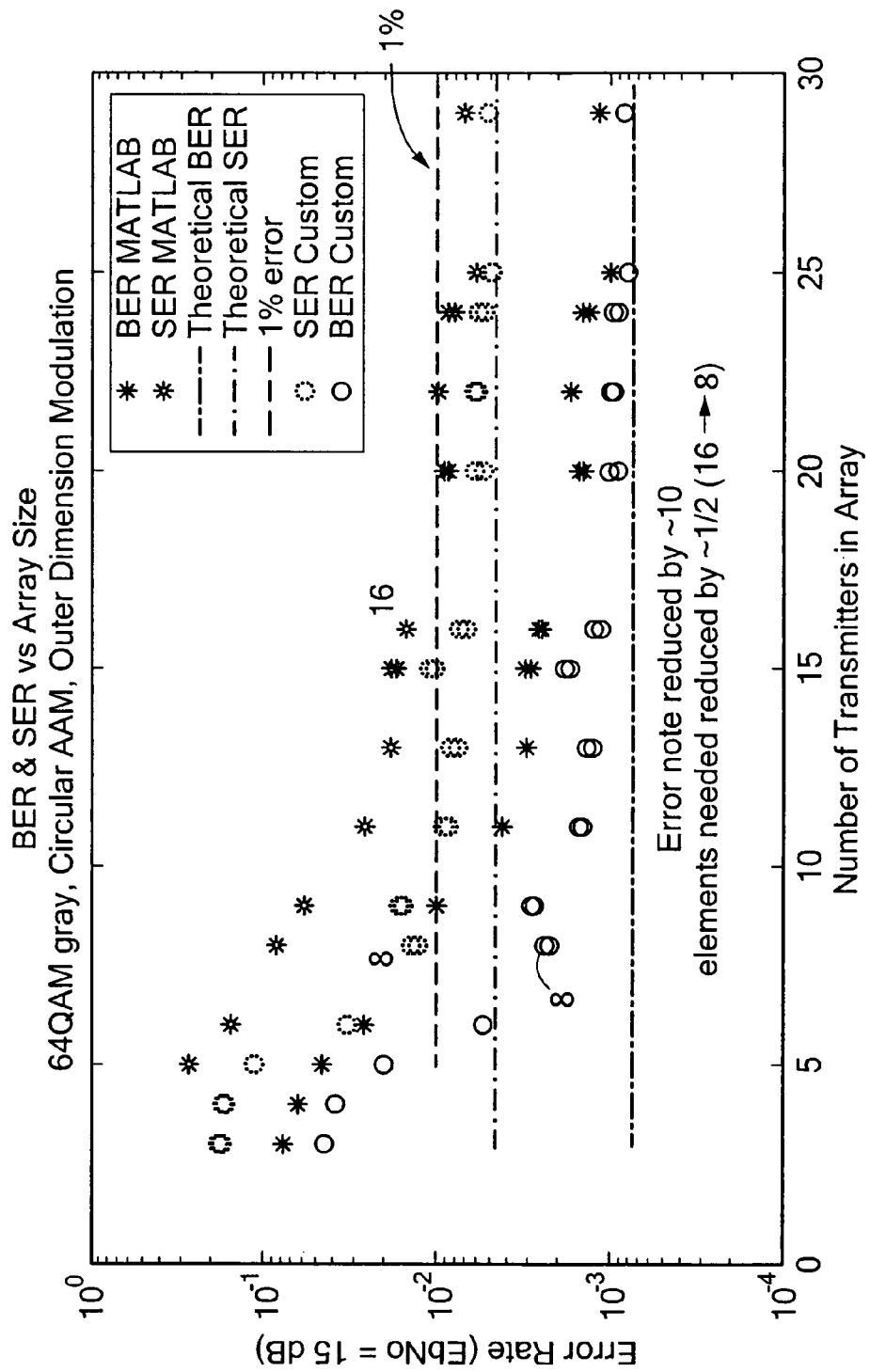
FIG. 10 illustrates the improvement in performance resulting from AAM custom modulation/demodulation small array quantization (SAQ) error.

In doing so, clusters are moved away or towards the origin according to the closest available power level. There will undoubtedly be some overlap with a lower number of power levels and as a result, the error rates cannot be eliminated completely. However, the resultant error rates are much smaller than without the custom modulation/demodulation. The comparison between the custom modulation/demodulation and regular modulation/demodulation is shown in FIGS. 9 and 10. The two errors compared are the outer diameter modulation steering error and the SAQ error for 64 QAM. In FIG. 9, the range of angles at which the error rates are near theoretical values is approximately doubled. In FIG. 10, the number of required transmitters for the error to be below 1% is approximately halved. Custom modulation/demodulation thus, can minimize the errors and bring the error rates of AAM closer to conventional QAM when the phased array transmitter only has a small number of elements or the transmitter is pointing away from the receiver.

Figure 11:
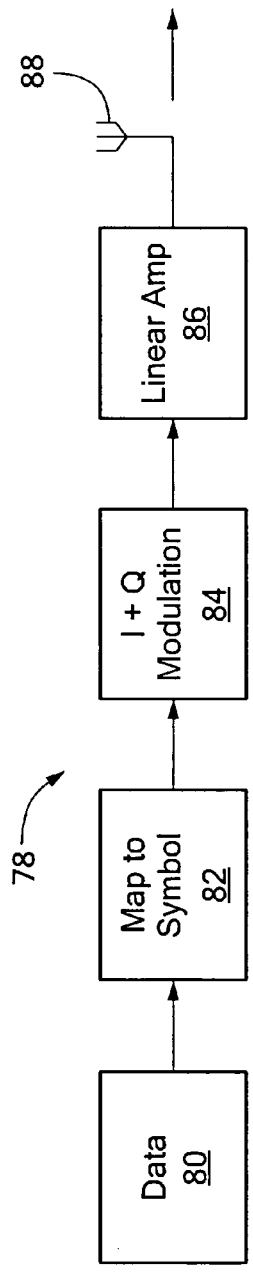
FIG. 11 is a simplified schematic block diagram of a prior art QAM.
Figure 12:
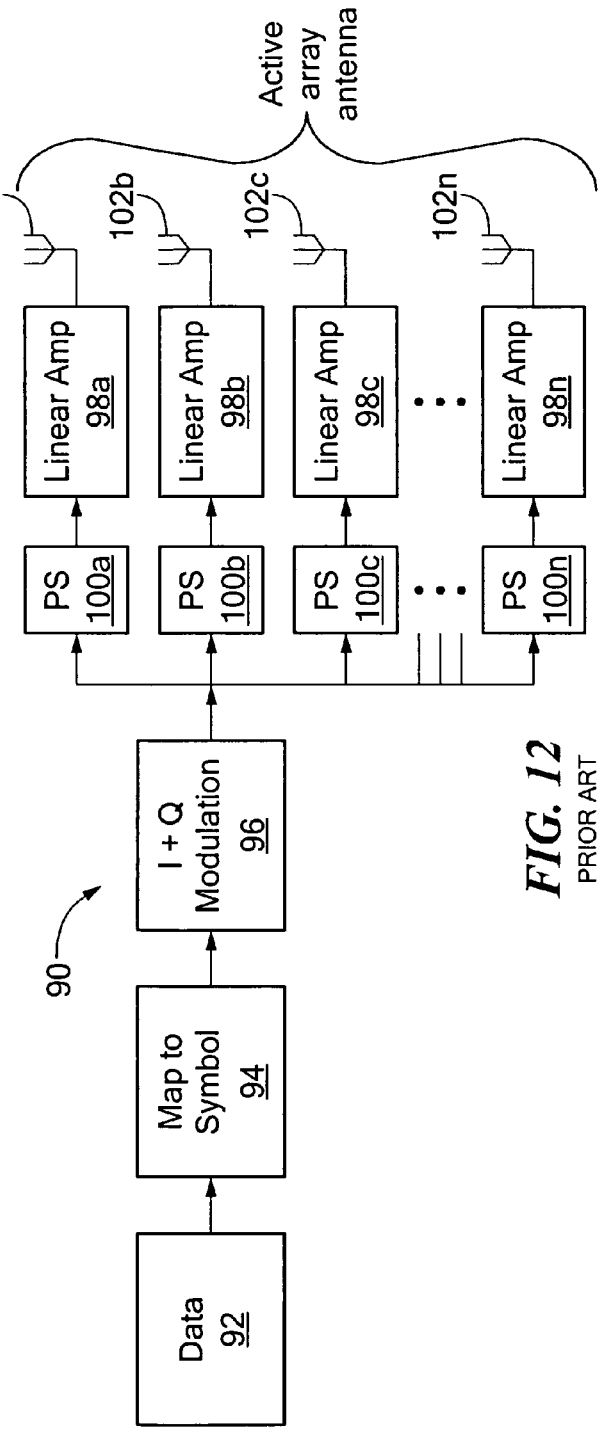
FIG. 12 is a simplified schematic diagram of a prior art QAM with an active phased array.

There is shown in FIG. 11 a block diagram of a conventional QAM system 78 where the input data 80 is mapped to a symbol 82 and then resolved into I and Q modulation 84 before being delivered to linear amp 86 that feeds antenna element 88. Conventional QAM's are often used with active phased arrays 90, FIG. 12, where the data 92 is again mapped to symbols 94 and then provided with I and Q modulation 96 before being delivered to phase shifting circuits 100a, 100b, 100c, . . . 100n then to linear amplifiers 98a, 98b, 98c, . . . 98n to effect the phased array operation of antennas 102a, 102b, 102c, . . . 102n.

Figure 13:
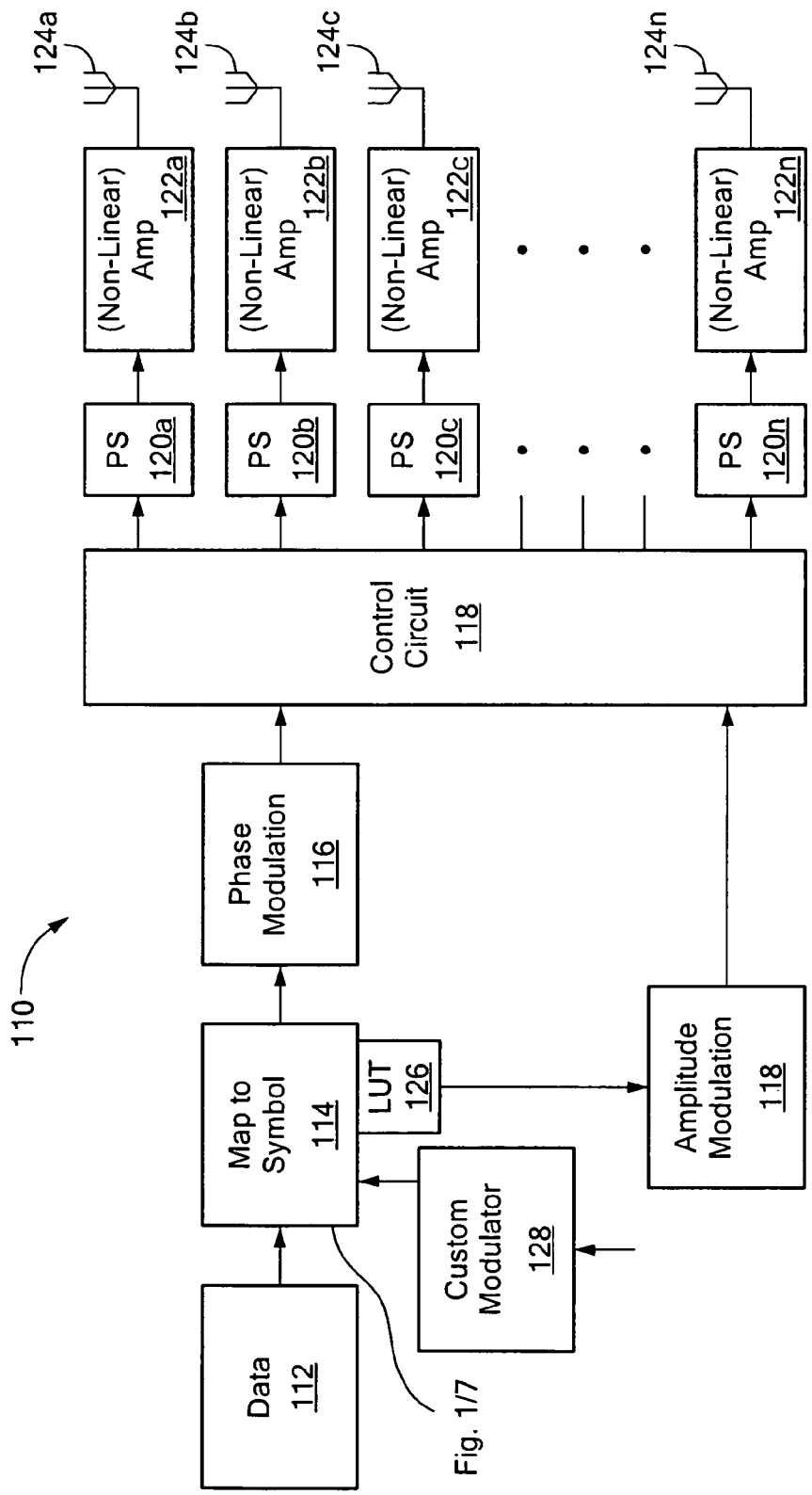
FIG. 13 is a simplified schematic block diagram of an array amplitude modulation (AAM) system in accordance with one embodiment of this invention.
Figure 14:
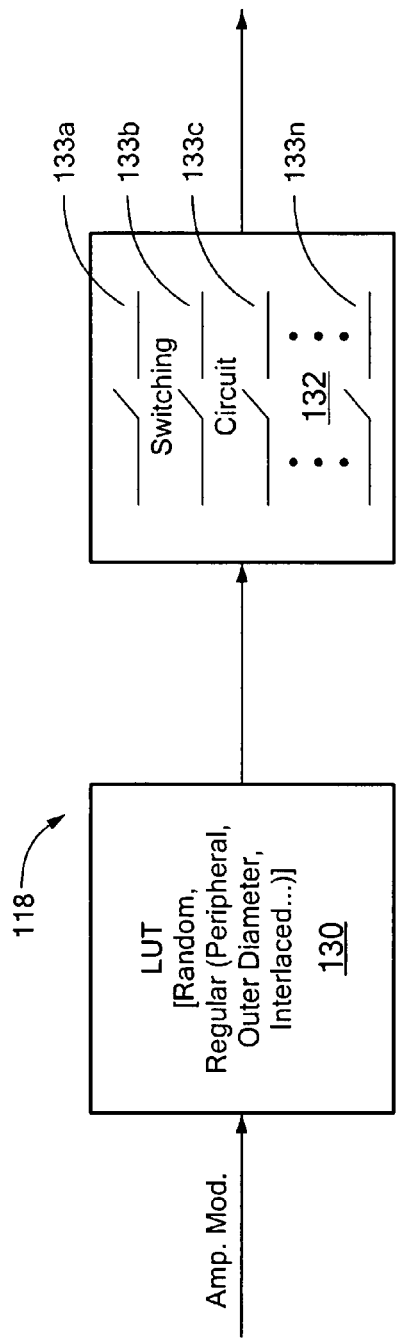
FIG. 14 is a more detailed schematic block diagram of the control circuit of FIG. 13.

In accordance with one embodiment of this invention array amplitude modulation system 110, FIG. 13, provides data 112 to be mapped to symbols 114 but then provides phase modulation 116 through control circuit 118 and phase shifting circuits 120a, 120b, 120c, . . . 120n to amplifiers preferably but not necessarily nonlinear amplifiers 122a, 122b, 122c, . . . 122n to power transmitting amplifiers 124a, 124b, 124c, 124n. Amplitude modulation is applied to control circuit 118 to switch on and off amplifiers 122a-122n in accordance with a particular pattern as described, supra. The particular switching pattern required or desired can be defined in hardware or software in real time or could be stored in a look-up table (LUT) 126, for example. Custom modulation to address SAQ error and or steering error can be provided through a custom modulator 128. Control circuit 118l may include a look-up table (LUT) 130 which may be populated with switching information for random or regular patterns. The regular pattern may include peripheral or interleaved. A peripheral pattern may include outer diameter pattern and many others. Also included in control circuit 118 is a switching circuit 132 including e.g. switching devices 133a-n to actually turn on and off the amplifiers 122a-122n to enable or disable them in powering antenna elements 124a-124n.

Figure 15:
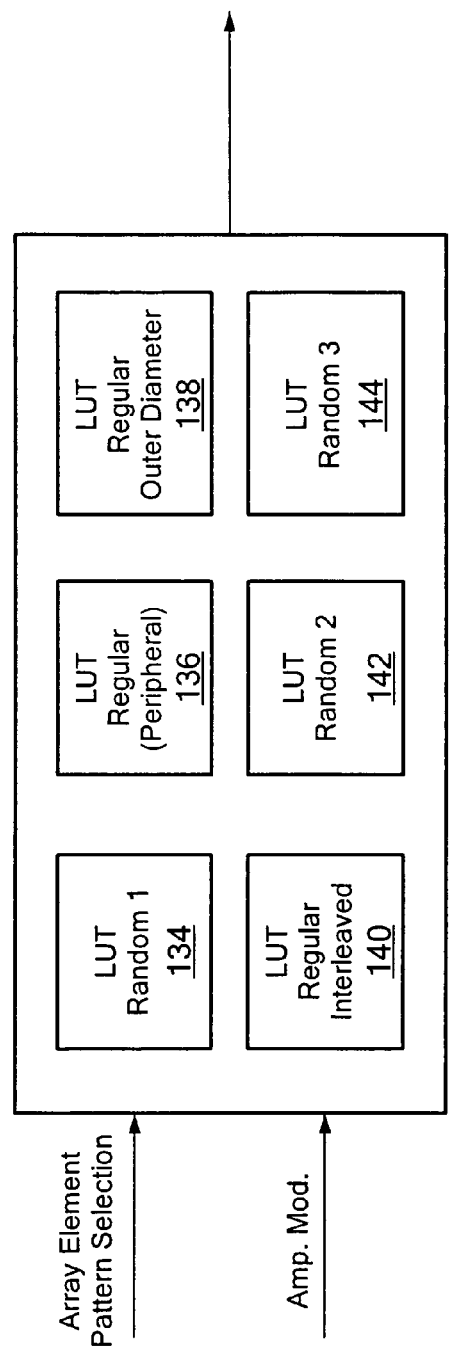
FIG. 15 is a more detailed schematic block diagram of the LUT of FIG. 14.

Look-up table 130 in one embodiment, FIG. 15, may include a number of individual look-up tables to be selected by an array element pattern selection signal. For example there may be a look-up table LUT random 1, 134; LUT regular (peripheral) 136, LUT regular (outer diameter) 138, LUT regular (interleaved) 140, LUT random 2, 142, LUT random 3, 144, and so on. With random patterns there may be many different realizations of the random LUT to change side lobes over time for specific symbols.

Figure 16:
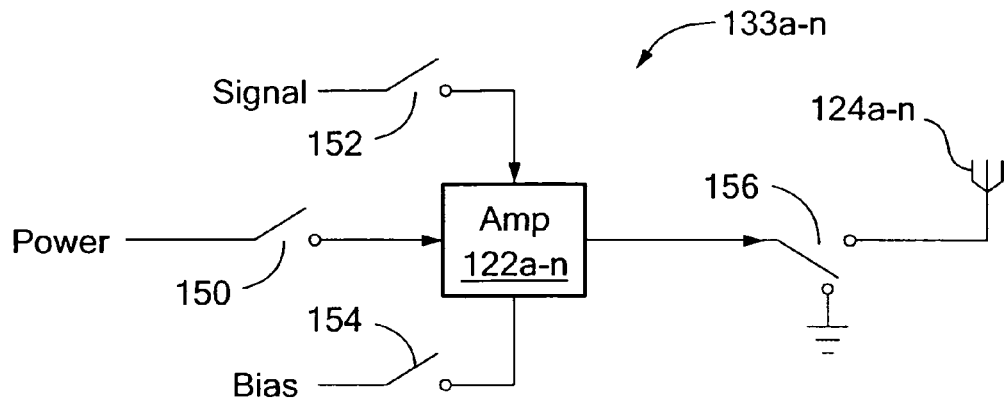
FIG. 16 is a simplified schematic illustrating a number of approaches to enable/disable the antenna/amplifier elements.
Figure 17:
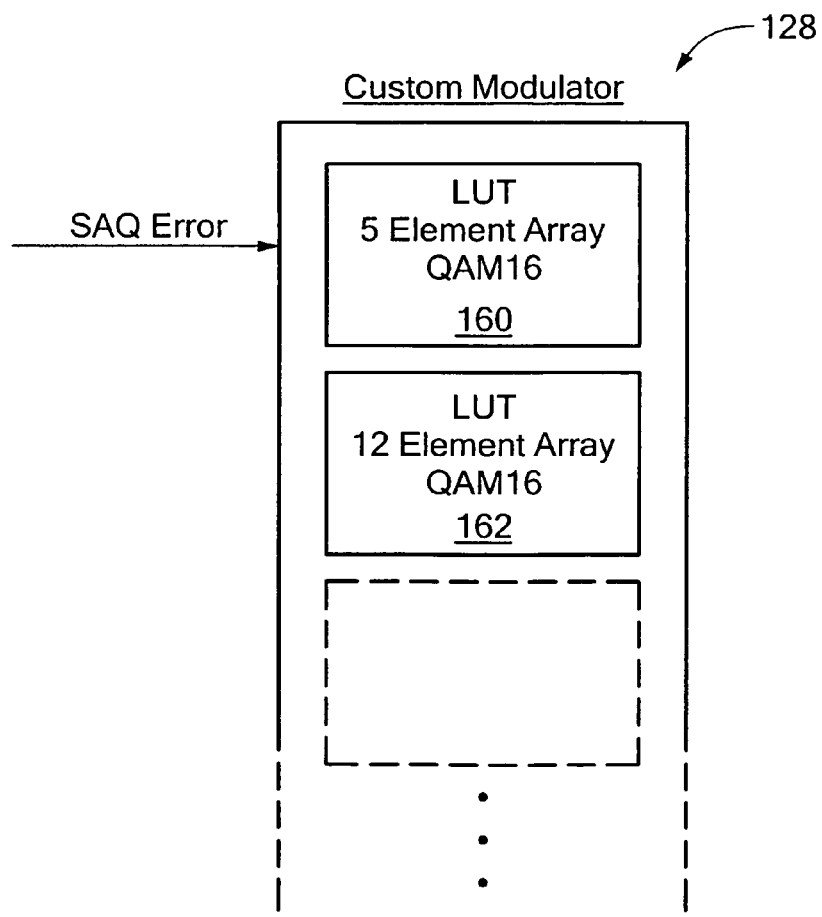
FIG. 17 is a more detailed schematic block diagram of the custom modulator of FIG. 13 for addressing SAQ error.
Figure 18:
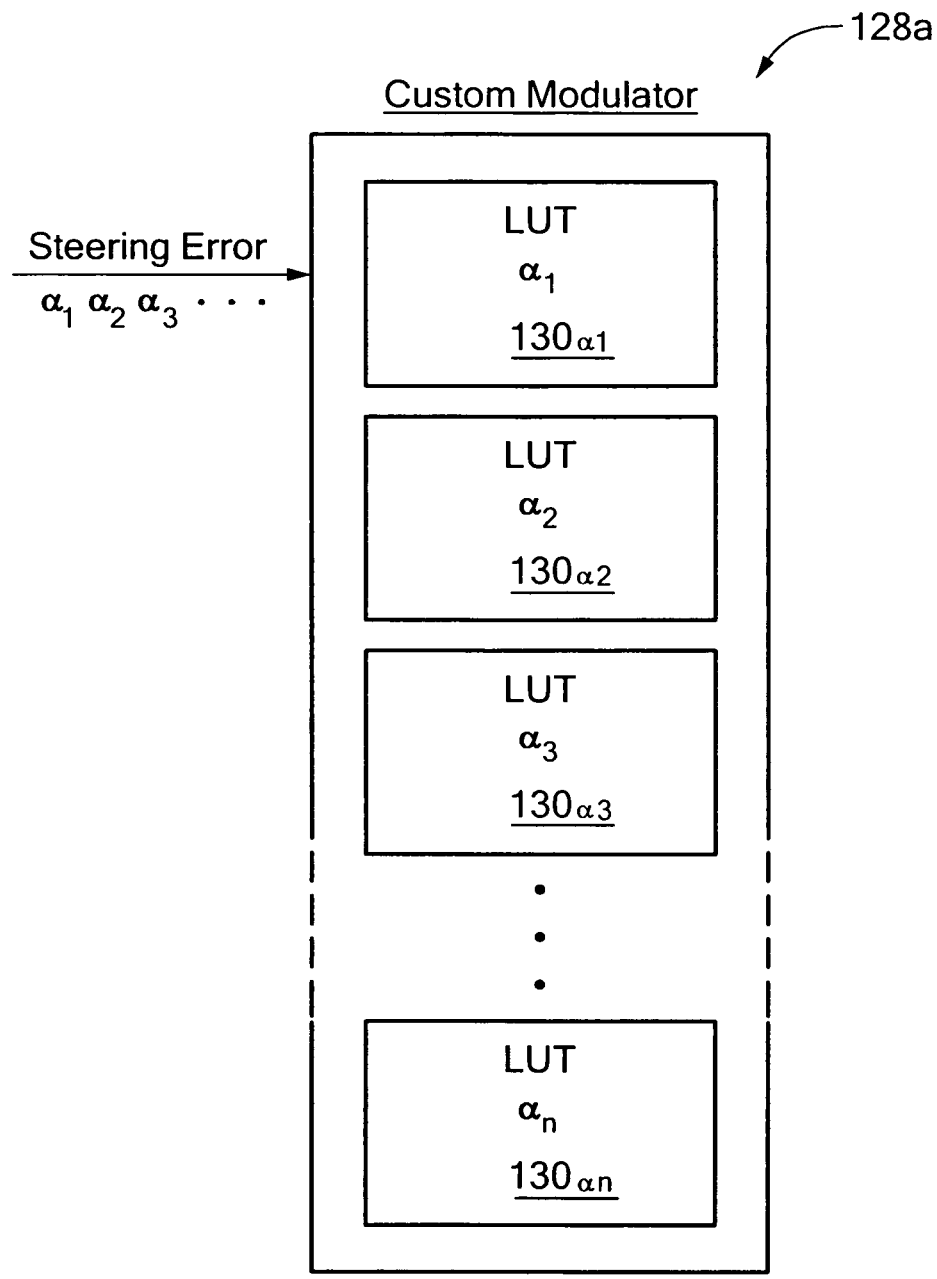
FIG. 18 is a more detailed schematic block diagram of the custom modulator of FIG. 13 for addressing steering error.

Each switching device 133a-133n, FIG. 16, may include a number of ways to enable/disable power to the associated antenna element 124a-124n: by controlling the power 150, controlling the input signal 152, controlling the bias 154, or controlling the output 156 of the associated amplifier 122a-122n. Again, the amplifier may be a linear amplifier such as a class A or B but preferably is a nonlinear amplifier such as a class C. Custom modulator 128, FIG. 13, is shown in greater detail in FIG. 17, where it is receives the SAQ error and has any number of LUT's, for example, five element array QAM 16, 160, twelve element array QAM 16, 162 and so on as shown in FIG. 17. Custom modulator 128a for accommodating steering error $\alpha_1, \alpha_2, \alpha_3, \ldots$ may also include a number of look-up tables LUT, $130_{\alpha 1}, 130_{\alpha 2}, 130_{\alpha n}$. Although custom modulator and 128 and 128a in FIGS. 17 and 18 are shown as using look-up tables, real time generation by hardware or software may be affected.

Figure 19:
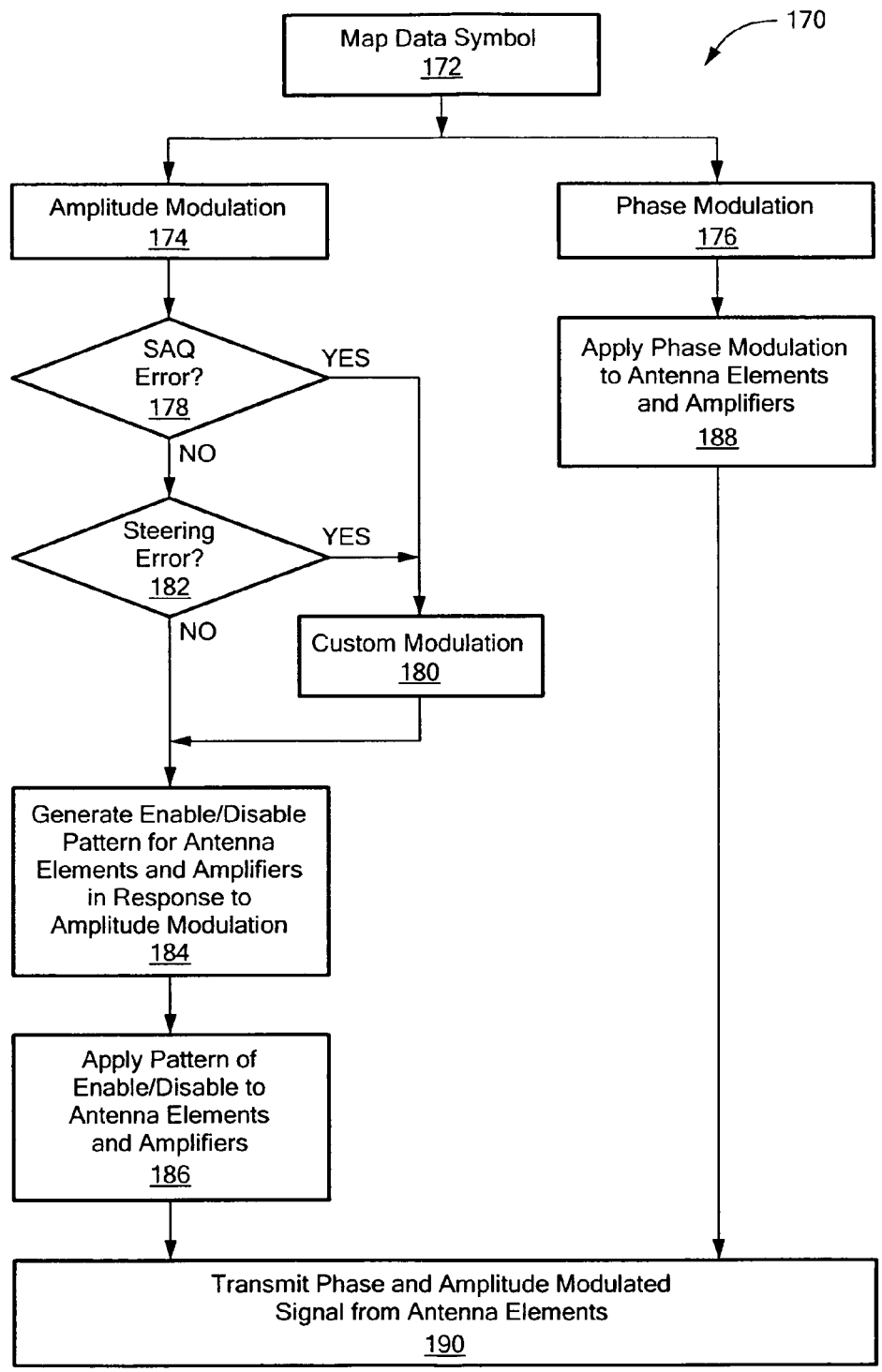
FIG. 19 is a flow chart illustrating one embodiment of the method of this invention.

Although thus far the invention has been described in terms of system the wholly new array amplitude modulation technique taught here is also embodied in a method or process as shown in FIG. 19. The method 170 begins with mapping the data symbol 172 from which is derived amplitude modulation 174, and phase modulation 176. If there is a SAQ error, 178 custom modulation 180 is called for. If there is a not a SAQ error inquiry is made as to whether there is steering error 182. If there is, again custom modulation 180 is called for. If not an enable/disabled pattern is generated for the antenna elements and amplifiers in response to the amplitude modulation 184. The pattern of enable/disable is applied to the antenna elements and amplifiers 186. Meanwhile phase modulation 176 is applied to the antenna elements and amplifiers 188 and then the pattern of enable/disable of the antenna elements and amplifiers derived from the amplitude modulation and the phase modulation is applied to transmit the phase and amplitude modulated signal from the antenna elements 190.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An array amplitude modulation system comprising:
   a mapping circuit for mapping a data symbol to a phase modulation signal and an amplitude modulation signal;
   a plurality of antenna elements;
   an amplifier associated with each antenna element, each amplifier having fixed amplification; and
   a control circuit responsive to said amplitude modulation signal to selectively enable/disable said amplifiers to produce a phase and amplitude modulation transmission from said antenna elements, the selectively enabling/disabling respectively turning on/off said amplifiers.

2. The array amplitude system of claim 1 in which said amplifiers include non-linear amplifiers.

3. The array amplitude system of claim 1 in which said control circuit includes a pattern generator for identifying the amplifiers to be selectively enabled/disabled.

4. The array amplitude system of claim 3 in which said control circuit includes a switching circuit responsive to said pattern generator circuit for selectively enabling/disabling identified amplifiers.

5. The array amplitude system of claim 3 in which said pattern generator includes a look-up table.

6. The array amplitude system of claim 3 in which said pattern generator generates a random pattern of amplifier enabling/disabling.

7. The array amplitude system of claim 3 in which said pattern generator generates a regular pattern of amplifier enabling/disabling.

8. The array amplitude system of claim 7 in which said regular pattern includes an interleaved pattern.

9. The array amplitude system of claim 7 in which said regular pattern includes a peripheral pattern of amplifier enabling/disabling.

10. The array amplitude system of claim 9 in which said peripheral pattern includes an outer diameter pattern.

11. The array amplitude system of claim 1 further including a custom modulator for generating a custom amplitude modulation signal shifted relative to said amplitude modulation signal and a matching custom demodulation scheme for demodulating the custom modulation.

12. The array amplitude system of claim 11 in which said custom modulator and/or demodulator is responsive to a small array quantizing error input to adjust for small array quantizing error.

13. The array amplitude system of claim 11 in which said custom modulator and/or demodulator is responsive to a steering error input to adjust for steering error.

14. A method of array amplitude modulation comprising:
    mapping a data symbol to a phase modulation signal and an amplitude modulation signal for transmission from antenna elements, the antenna elements each associated with a single amplifier having fixed amplification;
    applying the phase modulation signal to the antenna element amplifiers; and
    generating a pattern of enabling/disabling the antenna element amplifiers as a function of the amplitude modulation to produce a phase and amplitude modulated transmission from the antenna elements, wherein the enabling/disabling respectively turns on/off the amplifiers.

15. The method of array amplitude modulation of claim 14 in which said amplifiers are nonlinear amplifiers.

16. The method of array amplitude modulation of claim 14 in which said patterns include random and regular.

17. The method of array amplitude modulation of claim 16 in which said regular patterns include interleaved, peripheral, and outer diameter.

18. The method of array amplitude modulation of claim 14 further includes generating a custom amplitude modulation signal shifted relative to the amplitude modulation signal.

19. The method of array amplitude modulation of claim 18 in which the custom amplitude modulation signal is generated in response to a small array quantizing error signal.

20. The method of array amplitude modulation of claim 18 in which the custom amplitude modulation signal is generated in response to a steering error signal.

21. The array amplitude modulation system of claim 1 in which the phase modulation signal is normalized and in which the control circuit is configured to send the normalized phase modulation signal to each antenna element.

22. The method of claim 14 further comprising mapping the data symbol to a normalized phase modulation signal.

* * * * *